United States Patent
Soneta et al.

(10) Patent No.: US 9,523,938 B2
(45) Date of Patent: Dec. 20, 2016

(54) POLYMERIC DISPERSANT FOR LIQUID DEVELOPER, LIQUID DEVELOPER, AND PRINTED MATTER

(71) Applicants: TOYO INK SC HOLDINGS CO., LTD., Chuo-ku (JP); TOYO INK CO., LTD., Chuo-ku (JP)

(72) Inventors: Yuji Soneta, Tokyo (JP); Kazumasa Hattori, Tokyo (JP)

(73) Assignees: TOYO INK SC HOLDINGS CO., LTD., Chuo-ku (JP); TOYO INK CO., LTD., Chuo-ku (JP)

( * ) Notice: Subject to any disclaimer, the term of this patent is extended or adjusted under 35 U.S.C. 154(b) by 0 days.

(21) Appl. No.: 14/436,777

(22) PCT Filed: Oct. 17, 2013

(86) PCT No.: PCT/JP2013/078218
§ 371 (c)(1),
(2) Date: Apr. 17, 2015

(87) PCT Pub. No.: WO2014/061747
PCT Pub. Date: Apr. 24, 2014

(65) Prior Publication Data
US 2015/0268579 A1 Sep. 24, 2015

(30) Foreign Application Priority Data
Oct. 17, 2012 (JP) .................... 2012-230222

(51) Int. Cl.
| G03G 9/13 | (2006.01) |
| C08F 220/18 | (2006.01) |
| C08F 283/00 | (2006.01) |
| C09D 151/08 | (2006.01) |
| C09D 167/00 | (2006.01) |
| G03G 9/125 | (2006.01) |

(52) U.S. Cl.
CPC ............ G03G 9/131 (2013.01); C08F 220/18 (2013.01); C08F 283/00 (2013.01); C09D 151/08 (2013.01); C09D 167/00 (2013.01); G03G 9/125 (2013.01); G03G 9/132 (2013.01); C08F 2220/1883 (2013.01)

(58) Field of Classification Search
CPC ................................ G03G 9/131; G03G 9/133
See application file for complete search history.

(56) References Cited

U.S. PATENT DOCUMENTS

| 5,085,966 A | 2/1992 | Suzuki et al. | |
|---|---|---|---|
| 5,342,725 A | 8/1994 | Kato | |
| 5,789,133 A | 8/1998 | Yabuuchi et al. | |
| 6,203,961 B1 * | 3/2001 | Pan | G03G 9/132 430/114 |
| 6,326,449 B1 | 12/2001 | Haldankar | |
| 2004/0265722 A1 | 12/2004 | Qian et al. | |
| 2006/0276564 A1 | 12/2006 | Marko | |
| 2012/0315577 A1 * | 12/2012 | Moriguchi | G03G 9/132 430/114 |
| 2013/0034809 A1 * | 2/2013 | Iwata | G03G 9/13 430/114 |
| 2013/0078568 A1 * | 3/2013 | Inaba | G03G 9/135 430/112 |

FOREIGN PATENT DOCUMENTS

| EP | 0 695 974 A1 | 2/1996 |
| EP | 0 807 859 A1 | 11/1997 |
| JP | 3-188469 A | 8/1991 |
| JP | 3-271752 A | 12/1991 |
| JP | 5-333607 A | 12/1993 |
| JP | 6-11909 A | 1/1994 |
| JP | 9-218540 A | 8/1997 |
| JP | 9-311506 A | 12/1997 |
| JP | 2002-258543 A | 9/2002 |
| JP | 2003-5455 A | 1/2003 |
| JP | 2003-29469 A | 1/2003 |
| JP | 2004-341140 A | 12/2004 |
| JP | 2005-25197 A | 1/2005 |
| JP | 2007-505953 A | 3/2007 |
| JP | 2009-145535 A | 7/2009 |
| JP | 2009-229608 A | 10/2009 |
| JP | 2012-185359 A | 9/2012 |
| JP | 2013-130791 A | 7/2013 |
| JP | 2013-205623 A | 10/2013 |

OTHER PUBLICATIONS

International Search Report Issued Jan. 21, 2014 in PCT/JP13/078218 filed Oct. 17, 2013.
English Translation of the International Preliminary Report on Patentability and Written Opinion issued Apr. 30, 2015 in PCT/JP2013/078218.
Office Action issued on Feb. 2, 2016 in Japanese Patent Application No. 2014-542175 (with partial English language translation).
Extended Search Report issued Jun. 1, 2016 in European Patent Application No. 13846615.6.

* cited by examiner

Primary Examiner — Hoa V Le
(74) Attorney, Agent, or Firm — Oblon, McClelland, Maier & Neustadt, L.L.P.

(57) ABSTRACT

An embodiment of the present invention relates to a polymeric dispersant for a liquid developer, which is obtained by copolymerizing at least an ethylenically unsaturated monomer having an amino group, an ethylenically unsaturated monomer having an alkyl group with a carbon number of 9 to 24, and an ethylenically unsaturated monomer represented by general formula (1) shown below:

$$CH_2=C(R^1)COO(AO)_nR^2 \qquad \text{General formula (1)}$$

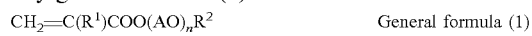

wherein, $R^1$ represents H or $CH_3$, $R^2$ represents a hydrogen atom or a hydrocarbon group having a carbon number of 1 to 22, n represents an integer of 1 to 200, and A represents an alkylene group having a carbon number of 2 to 4.

17 Claims, No Drawings

POLYMERIC DISPERSANT FOR LIQUID DEVELOPER, LIQUID DEVELOPER, AND PRINTED MATTER

TECHNICAL FIELD

Embodiments of the present invention relate to a polymeric dispersant for a liquid developer, a liquid developer, and printed matter.

BACKGROUND ART

In liquid developers, fine grinding and dispersion of the toner particles is performed in a wet state, and therefore compared with dry powder toners, better micronization of the toner particles is possible. Further, because liquid developers use a carrier liquid containing an insulating liquid as the carrier, problems caused by scattering of the toner particles inside the image forming device do not arise. As a result, a feature of image forming devices that use a liquid developer is their ability to form high-definition images.

In electrophotographic image forming devices that use a liquid developer, a developer containing finely micronized toner particles dispersed in a carrier liquid is used. An electrostatic latent image formed on a photoreceptor by exposure is developed using the toner particles in the carrier liquid. Following developing, the obtained electrostatic latent image is transferred to a recording medium such as paper, and is then dried and fixed to complete image formation.

A liquid developer contains toner particles dispersed in an electrically insulating carrier liquid, and the toner particles require colorability, fixability, chargeability and dispersion stability. The toner particles contain a colorant, a binder resin and an additive such as a dispersant, and in order to obtain superior images, it is desirable that the toner particles can be dispersed stably and charged stably (for example, see Patent Literatures 1 and 2).

Various dispersants have been investigated with the aim of achieving uniform dispersion of the toner particles in the electrically insulating carrier liquid and superior storage stability. However, if the toner particles are dispersed stably and the storage stability is improved, then the amount of heat required in the fixation process during image output to achieve melting, contact and coalescence of the toner particles increases, and the fixability of the toner particles to the substrate deteriorates. Further, other problems also arise, including occurrence of a cold offset phenomenon in which some of the incompletely melted toner particles adhere to the surface of the thermocompression bonding roller and are subsequently transferred to the next sheet of paper. Accordingly, achieving a combination of good fixability and cold offset resistance with favorable storage stability has been difficult. Hence, in order to achieve a combination of favorable fixability and storage stability for a liquid developer, polymeric dispersants that are less likely to inhibit fixation have been investigated (for example, see Patent Literature 3).

However, the effects of such polymeric dispersants cause other problems, including a deterioration in the charging characteristics of the toner, meaning satisfactory image density cannot be obtained, and a deterioration in the long-term stability of the image, resulting in a deterioration in the color development and color reproducibility.

CITATION LIST

Patent Literature

PLT 1: JP 05-333607 A
PLT 2: JP 2007-505953 A
PLT 3: JP 2009-145535 A

SUMMARY OF INVENTION

Technical Problem

As noted above, improvements are required to achieve a liquid developer that yields satisfactory image density, combines favorable storage stability, fixability and cold offset resistance, and enables superior enhancement of the image quality. A liquid developer that addresses these issues and exhibits excellent fixability and cold offset resistance, has excellent storage stability over long periods, and yields favorable output images has been keenly sought.

Accordingly, an object of one embodiment of the present invention is to provide a polymeric dispersant for a liquid developer that enables excellent image density to be obtained, exhibits superior fixability and cold offset resistance, and has excellent storage stability over long periods. Furthermore, objects of other embodiments of the present invention are to provide a liquid developer that enables excellent image density to be obtained, exhibits superior fixability and cold offset resistance, and has excellent storage stability over long periods, and to provide printed matter obtained using the liquid developer.

Solution to Problem

As a result of intensive investigation aimed at achieving the above objects, the inventors of the present invention discovered that the above objects could be achieved using the embodiments described below, and they were therefore able to complete the present invention.

One embodiment of the present invention relates to a polymeric dispersant for a liquid developer, which is obtained by copolymerizing at least an ethylenically unsaturated monomer having an amino group, an ethylenically unsaturated monomer having an alkyl group with a carbon number of 9 to 24, and an ethylenically unsaturated monomer represented by general formula (1) shown below.

$$CH_2=C(R^1)COO(AO)_nR^2 \qquad \text{General formula (1)}$$

In the formula, $R^1$ represents H or $CH_3$, $R^2$ represents a hydrogen atom or a hydrocarbon group having a carbon number of 1 to 22, n represents an integer of 1 to 200, and A represents an alkylene group having a carbon number of 2 to 4.

Further, another embodiment of the present invention relates to a liquid developer comprising at least a binder resin (A), a colorant (B), a polymeric dispersant (C) and a carrier liquid (D), wherein the polymeric dispersant (C) is the polymeric dispersant described above.

Moreover, yet another embodiment of the present invention relates to printed matter obtained using the liquid developer described above.

The disclosure of this application is related to the subject matter disclosed in Japanese Application 2012-230222 filed on Oct. 17, 2012, the entire contents of which are incorporated herein by reference.

Advantageous Effects of Invention

One embodiment of the present invention is able to provide a polymeric dispersant for a liquid developer that enables excellent image density to be obtained, exhibits superior fixability and cold offset resistance, and has excellent storage stability over long periods. Furthermore, other embodiments of the present invention are able to provide a liquid developer that enables excellent image density to be obtained, exhibits superior fixability and cold offset resistance and has excellent storage stability over long periods, and printed matter obtained using the liquid developer.

DESCRIPTION OF EMBODIMENTS

The present invention is described below in detail.

The polymeric dispersant according to one embodiment of the present invention is produced by copolymerizing at least an ethylenically unsaturated monomer having an amino group, an ethylenically unsaturated monomer having an alkyl group with a carbon number of 9 to 24, and an ethylenically unsaturated monomer represented by general formula (1). Further, the liquid developer according to another embodiment of the present invention comprises at least a binder resin (A), a colorant (B), a polymeric dispersant (C) and a carrier liquid (D), wherein the polymeric dispersant (C) is the polymeric dispersant described above. In the liquid developer, the binder resin (A) and the colorant (B) exist in the form of toner particles.

The polymeric dispersant (C) is obtained using an ethylenically unsaturated monomer having an amino group, and by ensuring that the monomer has a specific amine value, the adsorption rate of the polymeric dispersant (C) to the toner particles can be increased, and a liquid developer can be obtained that yields stable images (such as printed images from a copier or printed images from a printer) over long periods and superior storage stability. Further, by ensuring that the adsorption rate of the polymeric dispersant (C) to the toner particles is high, the grindability of the toner particles improves, the average particle size of the toner particles reduces, a liquid developer of low viscosity can be obtained with good efficiency, and images having excellent color development and color reproducibility can be obtained.

Moreover, by obtaining the polymeric dispersant (C) using an ethylenically unsaturated monomer having an alkyl group with a carbon number of 9 to 24, the solubility in the carrier liquid (D) improves, and excellent grindability and dispersion stability of the toner particles is obtained. Further, by obtaining the polymeric dispersant (C) using the ethylenically unsaturated monomer represented by general formula (1), the compatibility with the binder resin (A) improves, and when the toner particles undergo fixation to a substrate, the polymeric dispersant (C) does not inhibit the contact and coalescence of the toner particles, meaning excellent fixability and offset resistance can be obtained, and images having satisfactory image density and excellent color development and color reproducibility can be obtained.

The polymeric dispersant according to an embodiment of the present invention (hereafter referred to as the polymeric dispersant (C)), and the binder resin (A), the colorant (B), and the carrier liquid (D) and the like incorporated in the liquid developer according to another embodiment of the present invention are described below in further detail.

(Toner Particles)

The toner particles used in the liquid developer contain at least the binder resin (A) and the colorant (B), and preferably also contain additives such as a pigment dispersant and a charge control agent. Further, the polymeric dispersant (C) is preferably added when the toner particles are subjected to wet dispersion within the carrier liquid (D), but may also be added to the toner particles during preparation of the toner particles.

(Binder Resin (A))

The binder resin generally has a function of uniformly dispersing the colorant such as a pigment or dye within the resin, and a binder function during fixation of the toner particles to a substrate such as paper.

Examples of binder resins that may be used include homopolymers of styrene or substitutes thereof, such as polystyrene, poly-p-chlorostyrene and polyvinyltoluene; styrene-based copolymers or crosslinked styrene-based copolymers such as styrene-p-chlorostyrene copolymers, styrene-vinyltoluene copolymers, styrene-vinylnaphthalene copolymers, styrene-(meth)acrylate ester copolymers, styrene-methyl α-chloromethacrylate copolymers, styrene-acrylonitrile copolymers, styrene-vinyl methyl ether copolymers, styrene-vinyl ethyl ether copolymers, styrene-vinyl methyl ketone copolymers, styrene-butadiene copolymers, styrene-isoprene copolymers and styrene-acrylonitrile-indene copolymers; as well as polyvinyl chloride, phenolic resins, natural modified phenolic resins, natural resin-modified maleic acid resins, acrylic resins, methacrylic resins, polyvinyl acetate, silicone resins, polyester resins, polyurethane resins, polyamide resins, furan resins, epoxy resins, xylene resins, polyvinyl butyral resins, terpene resins, coumarone-indene resins and petroleum-based resins.

From the viewpoints of pigment dispersibility, grindability and fixability, the binder resin (A) used in the liquid developer is preferably a polyester resin (a-1). Moreover, in order to ensure that the resin does not impair the color tone of colorants of any color, the binder resin (A) is preferably colorless, transparent, white or a very light color.

The polyester resin (a-1) is preferably a thermoplastic polyester, and is preferably obtained by a polycondensation of a dihydric or trihydric or higher alcohol component and an acid component such as a carboxylic acid.

Examples of the alcohol component include:

dihydric alcohols such as ethylene glycol, 1,2-propylene glycol 1,3-propylene glycol, 1,3-butanediol, 1,4-butanediol, 2,3-butanediol, 1,4-butenediol, diethylene glycol, triethylene glycol, 1,5-pentanediol, 1,6-hexanediol, neopentyl glycol, 2-ethyl-1,3-hexanediol, bisphenol A, hydrogenated bisphenol A, 1,4-bis(hydroxymethyl)cyclohexane, and bisphenol derivatives represented by general formula (2) shown below; and trihydric or higher alcohols such as glycerol, diglycerol, sorbit, sorbitan, butanetriol, trimethylolethane, trimethylolpropane, pentaerythritol, dipentaerythritol and tripentaerythritol.

These alcohols may be used individually, or combinations of two or more compounds may be used.

[Chemical Formula 1]

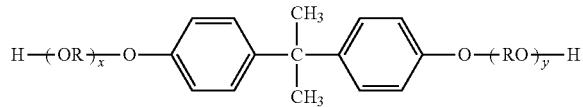

In the formula, R represents an ethylene group or a propylene group, each of x and y represents an integer of 1 or greater, and the average value of x+y is from 2 to 10.

Examples of the acid component include divalent carboxylic acids, including:

benzene dicarboxylic acids and anhydrides thereof, such as phthalic acid, terephthalic acid, isophthalic acid and phthalic anhydride;

alkyl dicarboxylic acids and anhydrides thereof, such as succinic acid, adipic acid, sebacic acid and azelaic acid;

succinic acid that has been substituted with an alkyl group having a carbon number of 16 to 18, and anhydrides thereof;

unsaturated dicarboxylic acids and anhydrides thereof, such as fumaric acid, maleic acid, citraconic acid, itaconic acid and glutaconic acid; as well as cyclohexane dicarboxylic acid, naphthalene dicarboxylic acid, diphenoxyethane-2,6-dicarboxylic acid, and anhydrides thereof.

Examples of trivalent or higher carboxylic acids which function as crosslinking components include trimellitic acid, pyromellitic acid, naphthalene tricarboxylic acid, butane tricarboxylic acid, hexane tricarboxylic acid, tetra(methylenecarboxyl)methane, octane tetracarboxylic acid, benzophenone tetracarboxylic acid, and anhydrides of these compounds.

These acid components may be used individually, or combinations of two or more components may be used.

Examples of preferred alcohol components include compounds obtained by adding an alkylene oxide (preferably 2 to 3 mol) to bisphenol A, as well as ethylene glycol and neopentyl glycol. Examples of preferred acid components include dicarboxylic acids such as phthalic acid, terephthalic acid, isophthalic acid, and anhydrides thereof, as well as n-dodecenyl succinic acid or the anhydride thereof, fumaric acid, maleic acid, and maleic anhydride; and tricarboxylic acids such as trimellitic acid or the anhydride thereof.

Furthermore, in the polycondensation of the polyester resin (a-1), a conventional reaction catalyst such as at least one metal compound selected from among compounds of antimony, titanium, tin, zinc and manganese may be used to accelerate the reaction. Specific examples of the reaction catalyst include di-n-butyltin oxide, stannous oxalate, antimony trioxide, titanium tetrabutoxide, manganese acetate and zinc acetate. Usually, the amount added of these reaction catalysts is preferably about 0.001 to 0.5 mol % relative to the acid component within the obtained polyester resin (a-1).

A conventional bulk polymerization method can be used as the polycondensation method, and in order to control the molecular weight and the softening temperature and the like of the polyester resin, the types of alcohol component and carboxylic acid that are reacted, the molar ratio between the two components, and other properties such as the reaction temperature, the reaction time, the reaction pressure and the catalyst may be adjusted as appropriate. Moreover, a commercially available product may also be used as the polyester resin. Examples of such products include DIACRON ER-502 and DIACRON ER-508 (both manufactured by Mitsubishi Rayon Co., Ltd.).

Moreover, in order to further enhance the fixability and the grindability, the binder resin (A) preferably contains the polyester resin (a-1), and at least one resin (a-2) selected from the group consisting of styrene resins, acrylic resins and styrene-acrylic copolymer resins (hereafter also referred to as simply "the resin (a-2)").

The styrene-acrylic copolymer resins are obtained by copolymerizing at least one styrene-based monomer and at least one compound selected from among (meth)acrylic acid and (meth)acrylate esters.

Examples of styrene-based monomers that can be used in the resin (a-2) include styrene, o-methylstyrene, m-methylstyrene, p-methylstyrene, α-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-phenylstyrene, p-chlorostyrene and 3,4-dichlorostyrene.

Examples of (meth)acrylate esters that can be used in the resin (a-2) include methyl (meth)acrylate, ethyl (meth)acrylate, propyl (meth)acrylate, butyl (meth)acrylate, isobutyl (meth)acrylate, octyl (meth)acrylate, 2-ethylhexyl (meth)acrylate, lauryl (meth)acrylate, dodecyl (meth)acrylate, stearyl (meth)acrylate, 2-chloroethyl (meth)acrylate, phenyl (meth)acrylate, dimethylaminoethyl acrylate and diethylaminoethyl (meth)acrylate.

Preferred styrene-based monomer is styrene. Preferred (meth)acrylate esters include butyl (meth)acrylate, octyl (meth)acrylate and 2-ethylhexyl (meth)acrylate.

Furthermore, in order to further increase the molecular weight of the resin (a-2), a polyfunctional monomer may be used as a crosslinking agent. Specific examples of such monomers include divinylbenzene, diethylene glycol di(meth)acrylate, triethylene glycol di(meth)acrylate, 1,6-hexanediol di(meth)acrylate, neopentyl glycol di(meth)acrylate and trimethylolpropane tri(meth)acrylate.

The aforementioned resin (a-2) can be obtained by a conventional polymerization method such as suspension polymerization, solution polymerization or emulsion polymerization. For example, in order to control the molecular weight and the softening temperature of the styrene-acrylic copolymer resin, the varieties of the aforementioned styrene-based monomer and (meth)acrylate ester, the molar ratio between the two monomers, and other properties such as the reaction temperature, the reaction time, the reaction pressure, the polymerization initiator and the crosslinking agent may be adjusted as appropriate. Moreover, a commercially available product may also be used as the styrene-acrylic copolymer resin. Examples of such products include ALMATEX CPR100, CPR200, CPR300 and CPR600B (manufactured by Mitsui Chemicals, Inc.).

Examples of the method used for mixing the polyester resin (a-1) and the resin (a-2) to obtain a more uniformly dispersed binder resin (A) include a method in which the polyester resin (a-1) and the resin (a-2) are subjected to melt kneading, and a method in which the monomers for either one of the polyester resin (a-1) and the resin (a-2) are added and polymerized in the presence of the other polymerized resin. The latter method is preferable in terms of obtaining a more uniformly dispersed binder resin, and in a preferred method, polycondensation of the polyester resin (a-1) is performed by bulk polymerization, the thus obtained polyester resin (a-1) is subsequently dissolved in a solvent, the resin (a-2) is then synthesized by solution polymerization within the solution of the polyester resin (a-1), under heating if required, and the solvent is then removed.

Moreover, synthesis by the conventional methods disclosed in JP 3,531,980 B and JP 2006-178296 A is also desirable.

Furthermore, in those cases when the polyester resin (a-1) and the resin (a-2) are prepared independently, or in cases where a commercially available polyester resin and resin (a-2) are used, the binder resin (A) can be obtained by mixing the polyester resin (a-1) and the resin (a-2). In such cases, either a method in which the two resins are dissolved in a solvent and mixed thoroughly and the solvent is removed, or a method in which the two resins are subjected to melt kneading may be used.

Moreover, the mass ratio [(a-2)/(a-1)] between the polyester resin (a-1) and the resin (a-2) contained within the binder resin (A) is preferably 1 or less. This mass ratio is more preferably 0.5 or less. If the mass ratio exceeds 1, then the grindability of the toner particles deteriorates, and the color development and storage stability as a liquid developer deteriorate.

(Softening Temperature (T4))

The softening temperature of the binder resin (A) is preferably within a range from 80° C. to 140° C., and more preferably within a range from 90° C. to 130° C. The softening temperature (T4) that is measured refers to a value measured using a Flow Tester CFT-500D manufactured by Shimadzu Corporation, under conditions including a start temperature of 40° C., a rate of temperature increase of 6.0° C./min, a test load of 20 kgf, a preheating time of 300 seconds, a die hole diameter of 0.5 mm and a die length of 1.0 mm, and represents the temperature when 4 mm of a sample of 1.0 g flows out.

If the softening temperature of the binder resin (A) is lower than 80° C., then the binder resin may undergo excessive softening during kneading, causing a deterioration in the dispersibility of the colorant (B), and making it difficult to achieve satisfactory image density as a liquid developer. Moreover, in the fixation process during image output, because the toner particles make contact with the surface of the thermocompression bonding roller in a melted state, the cohesion of the toner particles becomes smaller than the adhesion between the substrate and the thermocompression bonding roller, and there is an increased likelihood of the hot offset phenomenon occurring, in which a portion of the toner particles do not undergo complete fixation, but rather adhere to the surface of the thermocompression bonding roller and are transferred to the next sheet of paper. In contrast, if the softening temperature is higher than 140° C., then various other problems may arise, including difficulty in achieving favorable fixability, inferior grindability, and inferior color development.

(Average Molecular Weight)

In terms of offset resistance, fixability and image quality characteristics, the binder resin (A) preferably has a weight-average molecular weight (Mw) measured by gel permeation chromatography (GPC) of 2,000 to 100,000, and more preferably 5,000 to 50,000. If the weight-average molecular weight (Mw) of the binder resin (A) is less than 2,000, then the hot offset resistance, the color reproducibility and the dispersion stability may deteriorate, whereas if the weight-average molecular weight is greater than 100,000, then the fixability and the cold offset resistance may deteriorate.

Further, the binder resin (A) may have either a two-peak molecular weight distribution curve composed of a specific low-molecular weight polycondensate component and a specific high-molecular weight polycondensate component, or a single-peak simple molecular weight distribution curve.

Moreover, in the molecular weight measured by gel permeation chromatography (GPC), the ratio Mw/Mn between the weight-average molecular weight (Mw) and the number-average molecular weight (Mn) of the binder resin (A) is preferably within a range from 2 to 15. If Mw/Mn is less than 2, then the offset resistance deteriorates, and the offset-resistant region may narrow, resulting in a deterioration in the low-temperature fixability. If Mw/Mn exceeds 15, then the grindability of the toner particles deteriorates, and the image characteristics may deteriorate, including an inability to obtain satisfactory image density and a deterioration in the color development properties.

The aforementioned molecular weight and molecular weight distribution determined by GPC can be measured, for example, using a Gel Permeation Chromatograph HLC-8220 manufactured by Tosoh Corporation, under the conditions described below.

The column is stabilized inside a 40° C. heat chamber, tetrahydrofuran (THF) is passed through the column as a solvent at this temperature at a rate of 0.6 mL per minute, and 10 μL of a sample solution dissolved in THF is then injected into the column and measured. During measurement of the molecular weight of the sample, the molecular weight distribution of the sample is calculated from the relationship between the count value and the logarithmic value of a calibration curve prepared using a series of monodisperse polystyrene standard samples.

Ten polystyrenes manufactured by Tosoh Corporation and having molecular weights of about $10^2$ to $10^7$ are used as the standard polystyrene samples for preparing the calibration curve. An RI (refractive index) detector is used for the detector. Three TSKgel Super HM-M columns (manufactured by Tosoh Corporation) are used for the column.

Further, the measurement sample is prepared in the manner described below. The sample is added to THF, after standing for several hours the sample is shaken well and mixed thoroughly with the THF until no aggregates of the sample remain, and the sample is then left to stand for at least a further 12 hours. At this time, the total standing time in THF is adjusted to at least 24 hours. Subsequently, the thus obtained solution is passed through a sample treatment filter to obtain a sample solution for GPC measurement. The sample concentration is adjusted so that the resin component concentration is within a range from 0.5 to 5 mg/mL.

The amount of the binder resin (A) contained within the toner particles is preferably from 60 to 95 parts by mass, and more preferably from 70 to 90 parts by mass, per 100 parts by mass of the toner particles. If this amount is less than 60 parts by mass, then the fixability and offset resistance may sometimes deteriorate, whereas if the amount exceeds 95 parts by mass, then the ratio of the binder resin (A) relative to the colorant (B) becomes overly large, meaning the coloring power of the toner particles may deteriorate, and the image density may decrease.

(Colorant (B))

Various yellow, magenta, cyan and black organic pigments, organic dyes, and particularly salt-forming compounds thereof; carbon blacks; and magnetic substances described below can be used favorably as the colorant (B). These colorants may be used individually, or combinations of two or more colorants may be used. The colorant (B) is preferably insoluble in the carrier liquid (D).

For the yellow colorant, a yellow organic pigment or a salt-forming compound of a yellow dye is preferably used.

Examples of yellow organic pigments that can be used include benzimidazolone compounds, condensed azo compounds, isoindolinone compounds, anthraquinone compounds, quinophthalone compounds, azo metal complex compounds, methine compounds and arylamide compounds. Specifically, C.I. Pigment Yellow 12, 13, 14, 15, 17, 62, 74, 83, 93, 94, 95, 97, 109, 110, 111, 120, 127, 128, 129, 138, 139, 147, 150, 168, 174, 176, 180, 181, and 191 and the like can be used favorably. Among these, the use of a quinophthalone compound, condensed azo compound or benzimidazolone compound is preferable.

For the yellow dye salt-forming compound, a salt-forming compound of an acid dye or a salt-forming compound of a basic dye can be used. The salt-forming compound of an acid dye is preferably a salt-forming compound formed from C.I. Acid Yellow 11 or 23 (tartrazine) and a quaternary ammonium salt compound. By forming a quaternary ammonium salt, the toner particles are able to hold a stable positive charge.

For the magenta colorant, a magenta organic pigment or a salt-forming compound of a magenta dye is preferably used.

Examples of magenta organic pigments that can be used include condensed azo compounds, diketopyrrolopyrrole compounds, anthraquinone, quinacridone compounds, lake compounds of basic dyes such as rhodamine lake, naphthol compounds, benzimidazolone compounds, thioindigo compounds and perylene compounds. Specifically, C.I. Pigment Red 2, 3, 5, 6, 7, 23, 48:2, 48:3, 48:4, 57:1, 81, 81:1, 81:2, 81:3, 81:4, 122, 144, 146, 166, 169, 177, 184, 185, 202, 206, 209, 220, 221, 254, 255, 268, and 269 and the like, and C.I. Pigment Violet 1 and 19 and the like can be used favorably. Among these, the use of a quinacridone compound, rhodamine lake-based pigment, or naphthol-based pigment or the like is particularly preferable. Specifically, naphthol AS (such as C.I. Pigment Red 269), rhodamine lake (such as C.I. Pigment Red 81, 81:1, 81:2, 81:3, 81:4 and 169), quinacridone (such as C.I. Pigment Red 122), and carmine 6B (C.I. Pigment 57:1) are preferred materials.

Further, a material that combines a quinacridone pigment and the monoazo pigment carmine 6B (C.I. Pigment 57:1) yields a favorable magenta or red color, and is therefore preferred.

Furthermore, for the magenta dye salt-forming compound, a salt-forming compound of a rhodamine-based acid dye or a salt-forming compound of a rhodamine-based basic dye can be used favorably. The salt-forming compound of a basic dye is preferably a salt-forming compound formed from C.I. Basic Red 1 or C.I. Basic Violet 10, and a colorless organic sulfonic acid or organic carboxylic acid (which does not impair the color development of the colorant). Basic dyes exhibit favorable positive charging characteristics, and therefore the toner particles are able to hold a stable positive charge. Examples of compounds that can be used favorably as the organic sulfonic acid include naphthalene sulfonic acid, naphthol sulfonic acid, and naphthylamine sulfonic acid. Examples of compounds that can be used favorably as the organic carboxylic acid include salicylic acid derivatives and higher fatty acids and the like.

For the cyan colorant, a cyan or blue organic pigment, a salt-forming compound of a cyan or blue dye, or a cyan or blue oil-soluble dye is preferably used.

Examples of cyan organic pigments that can be used include copper phthalocyanine compounds and derivatives thereof, anthraquinone compounds, and basic dye lake compounds and the like. Specifically, C.I. Pigment Blue 1, 7, 15, 15:1, 15:2, 15:3, 15:4, 15:6, 60, 62, and 66 and the like can be used favorably. Among these, the use of a copper phthalocyanine compound such as C.I. Pigment Blue 15:3 is particularly preferable.

Further, the use of a triarylmethane-based dye-derived compound in combination with an aforementioned organic pigment is also preferable. Triarylmethane-based dyes have favorable positive charging characteristics, and are therefore effective both in terms of controlling the chargeability, and the colorability. A triarylmethane-based oil-soluble dye such as C.I. Pigment Blue 124 or a salt-forming compound of a triarylmethane-based basic dye is particularly favorable. For the C.I. Pigment 124, the product COPY BLUE PR manufactured by Clariant Ltd. is a preferred material. This product is obtained by a condensation of C.I. Pigment Red 9 (para magenta) and aniline.

Moreover, in order to alter the color tone, a green pigment may be used as a complementary color in addition to the aforementioned cyan or blue organic pigment, salt-forming compound of a cyan or blue dye, or cyan or blue oil-soluble dye. Specific examples of preferred green pigments include halogenated phthalocyanine compounds such as C.I. Pigment Green 7 and 36.

For the black colorant, in terms of cost and handling properties, a carbon black, a black organic pigment such as perylene black, or a black organic dye such as nigrosin dye or an azo metal complex dye is preferably used.

Any of the various carbon blacks can be used, including furnace black, channel black, acetylene black, and biomass-derived carbon black. Furnace black carbon and biomass carbon have the effect of reducing fogging (staining of white portions) in the image characteristics, and are therefore preferred.

For the nigrosin dye, the use of a dye prepared by finely grinding a nigrosin base by wet grinding or the like to achieve a volume-average particle size of 0.5 to 2 μm is preferable. This finely ground nigrosin dye has glossy properties, and therefore a glossy black can be obtained. The fine grinding of the nigrosin is achieved using the method disclosed in JP 2006-171501 A.

Further, a black colorant may also be obtained using three colorants, namely yellow, magenta and cyan colorants, from among the aforementioned colorants.

In order to obtain a black color having good image density and contrast, a colorant prepared by adding 1 to 10 parts by mass of a blue colorant to 100 parts by mass of a black colorant is preferably used as the black colorant. A halogen-free metal phthalocyanine blue compound, triarylmethane compound, or dioxazine violet pigment or the like is preferably used as the blue colorant. The fact that phthalocyanine blue compounds and triarylmethane compounds have stable positive charging characteristics is also effective in obtaining good black toner particles. Specific examples of blue colorants that can be used favorably include C.I. Pigment Blue 15:3, Victoria pure blue lake pigment (C.I. Pigment 1), C.I. Pigment Violet 23, C.I. Pigment Violet 19, salt-forming compounds formed from a triarylmethane-based basic dye and an essentially colorless organic acid (salt-forming compounds of C.I. Pigment 7 and an organic acid), and triarylmethane-based oil-soluble dyes.

Triarylmethane-based dyes have favorable positive charging characteristics, and are therefore effective in controlling the chargeability of the toner particles, and among such dyes, triarylmethane-based oil-soluble dyes having excellent dispersibility are particularly preferred.

The amount of the colorant (B) contained within the toner particles varies depending on the type of binder resin (A) that is used, but is typically from 5 to 40 parts by mass, and more preferably from 10 to 30 parts by mass, per 100 parts by mass of the toner particles.

In order to obtain a full color image using the liquid developer, by using the basic four-color process using Y, M, C and Bk, a favorable image having good fixability and color development can be obtained. Intermediate colors such as violet and green may also be used in addition to the above four colors.

(Polymeric Dispersant (C))

A dispersant is generally added to the carrier liquid containing the toner particles, and has the effects of uniformly dispersing the toner particles and improving the developing characteristics, but the polymeric dispersant (C) may be either added to the carrier liquid, or added to the toner particles during the kneading process performed during toner production. When added to the carrier liquid to disperse the toner particles, it is assumed that the polymeric dispersant (C) adsorbs to the binder resin portions on the surface of the toner particles, and particularly to polyester resin portions which exhibit an excellent dispersion-stabilizing effect.

In this manner, the polymeric dispersant (C) preferably exists in either an adsorbed state on the surface of the toner particles, or in a dispersed state inside the toner particles.

The polymeric dispersant (C) is a copolymer obtained from copolymerizable polymeric monomers including an ethylenically unsaturated monomer having an amino group, an ethylenically unsaturated monomer having an alkyl group with a carbon number of 9 to 24, and an ethylenically unsaturated monomer represented by general formula (1). A preferred polymerization method for the polymeric dispersant (C) involves a typical acrylic resin solution polymerization.

The ratio (molar ratio of the blend amount) of the ethylenically unsaturated monomer having an amino group is preferably from 1 to 50%, more preferably from 5 to 40%, and most preferably from 10 to 30%. The ratio of the ethylenically unsaturated monomer having an alkyl group with a carbon number of 9 to 24 is preferably from 5 to 90%, more preferably from 20 to 80%, and most preferably from 40 to 70%. The ratio of the ethylenically unsaturated monomer represented by general formula (1) is preferably from 1 to 50%, more preferably from 5 to 40%, and most preferably from 10 to 30%.

The polymeric dispersant (C) can be obtained, in accordance with the required molecular weight for the target polymeric dispersant (C), by mixing and then heating the ethylenically unsaturated monomer having an amino group, the ethylenically unsaturated monomer having an alkyl group with a carbon number of 9 to 24, and the ethylenically unsaturated monomer represented by general formula (1), together with an optional polymerization initiator and chain transfer agent and the like. The reaction temperature is typically from 40 to 150° C., and preferably from 50 to 110° C.

(Polymerization Initiator)

There are no particular limitations on the polymerization initiator used in the polymerization of the polymeric dispersant (C), and for example, azo-based compounds and organic peroxides can be used. During polymerization, an optional amount of 0.001 to 5 parts by mass of the polymerization initiator per 100 parts by mass of the combined monomers may be used.

Specific examples of the azo-based compounds include 2,2'-azobis(isobutyronitrile), 2,2'-azobis(2-methylbutyronitrile), 1,1'-azobis(cyclohexane-1-carbonitrile), 2,2'-azobis(2,4-dimethylvaleronitrile), 2,2'-azobis(2,4-dimethyl-4-methoxyvaleronitrile), dimethyl 2,2'-azobis(2-methylpropionate), 4,4'-azobis(4-cyanovaleric acid), 2,2'-azobis(2-hydroxymethylpropionitrile) and 2,2'-azobis[2-(2-imidazolin-2-yl)propane].

Specific examples of the organic peroxides include benzoyl peroxide, t-butyl perbenzoate, cumene hydroperoxide, diisopropyl peroxydicarbonate, di-n-propyl peroxydicarbonate, di(2-ethoxyethyl) peroxydicarbonate, t-butyl peroxyneodecanoate, t-butyl peroxypivalate, (3,5,5-trimethylhexanoyl) peroxide, dipropionyl peroxide and diacetyl peroxide.

These polymerization initiators may be used individually, or combinations of two or more polymerization initiators may be used.

(Chain Transfer Agent)

Examples of chain transfer agents that can be used include thiol-based compounds such as mercaptan-based, thioglycol-based and β-mercaptopropionic acid-based compounds; and rosin-based compounds and terpene-based compounds having an allyl hydrogen. When a chain transfer agent is used, the amount added is typically from 0.01 to 10.0 parts by mass, and preferably from 0.1 to 5 parts by mass, per 100 parts by mass of the combined monomers.

(Polymerization Solvent)

During synthesis of the polymeric dispersant (C), a conventional solvent can be used favorably. However, when the polymeric dispersant (C) is to be used in a liquid developer, the polymeric dispersant (C) is preferably either extracted in a solution state dissolved in the solvent of the carrier liquid (D) used in the liquid developer, or extracted as a solid. When the polymeric dispersant (C) is added during wet dispersion of the toner particles within the carrier liquid (D), the polymeric dispersant (C) is preferably dissolved in the carrier liquid (D), whereas when the polymeric dispersant (C) is added to the toner particles during preparation of the toner particles, the polymeric dispersant (C) is preferably a solid.

The following three methods may be used to obtain the polymeric dispersant (C) dissolved in the carrier liquid (D).

In the first method, the polymerization is performed using the carrier liquid (D) used in the liquid developer as the synthesis solvent.

In the second method, the polymerization is performed in a solvent that can be substituted with the carrier liquid (D), and subsequently, the carrier liquid (D) is added and only the solvent used in the polymerization is removed by distillation.

In the third method, the polymerization is performed in a mixed solution containing the carrier liquid (D) and a solvent that can be substituted with the carrier liquid (D), and subsequently, all the solvent besides the carrier liquid (D) is removed by distillation.

Accordingly, for the polymerization solvent, it is preferable to use either a solvent that can be substituted with the carrier liquid used in the liquid developer following synthesis of the polymeric dispersant (C), or a solvent that can be removed by distillation.

The solvent that can be substituted with the carrier liquid (D) is preferably a solvent having a lower boiling point than that of the carrier liquid (D). Examples of solvents that can be used include ethyl acetate, n-propyl acetate, n-butyl acetate, isobutyl acetate, toluene, acetone, hexane, methyl ethyl ketone, ethanol, propanol and butanol. Mixtures of two or more these polymerization solvents may also be used. Among these solvents, from the viewpoints of the polymerization temperature, the ease of removal of the solvent by distillation, and the polarity of the solvent and the like, n-propyl acetate or toluene is particularly preferable.

When the polymeric dispersant (C) is extracted as a solid, the solvent is removed by distillation following the polymerization. There are no particular limitations on the solvents that can be removed by distillation, but the types of solvents mentioned above that can be easily removed by distillation are preferable.

(Ethylenically Unsaturated Monomer Having an Amino Group)

The ethylenically unsaturated monomer having an amino group enhances the adsorption rate of the polymeric dispersant (C) to the toner particles, and contributes to stable images and excellent storage stability over long periods. Although there are no particular limitations on the amino group in the ethylenically unsaturated monomer having an amino group, a secondary amino group or tertiary amino group is preferable, and a tertiary amino group is particularly preferred. Here, the term "amino group" does not include amino groups that constitute an amide linkage. For example, alkyl (meth)acrylamides, which represent examples of the ethylenically unsaturated monomer having an alkyl group with a carbon number of 9 to 24, are unable to produce the effects provided by the ethylenically unsaturated monomer having an amino group.

Among the various possible ethylenically unsaturated monomer having an amino group, specific examples of ethylenically unsaturated monomers having a tertiary amino group include:

N,N-dialkylamino group-containing (meth)acrylate esters such as N,N-dimethylaminoethyl (meth)acrylate, N,N-diethylaminoethyl (meth)acrylate, N,N-dimethylaminopropyl (meth)acrylate and N,N-diethylaminopropyl (meth)acrylate;

N,N-dialkylamino group-containing (meth)acrylamides such as N,N-dimethylaminoethyl (meth)acrylamide, N,N-diethylaminoethyl (meth)acrylamide, N,N-dimethylaminopropyl (meth)acrylamide and N,N-diethylaminopropyl (meth)acrylamide;

dimethylaminostyrene and diethylaminostyrene.

Specific examples of ethylenically unsaturated monomers having a secondary amino group include tert-butylaminoethyl (meth)acrylate and tetramethylpiperidinyl (meth)acrylate.

Among the above compounds, from the viewpoint of dispersibility, N,N-dimethylaminoethyl (meth)acrylate, N,N-diethylaminoethyl (meth)acrylate, and N,N-dimethylaminopropyl (meth)acrylate and the like are preferable. Combinations of two or more ethylenically unsaturated monomers having an amino group may also be used.

The amine value of the polymeric dispersant (C) is preferably from 5 to 150 mgKOH/g, and more preferably from 30 to 100 mgKOH/g. If the amine value is less than 5 mgKOH/g, then the adsorption to the toner particles is weak, and the grindability during wet grinding may sometimes deteriorate. Moreover, long-term storage may cause aggregation of the toner particles, and increases in the viscosity of the liquid developer and the average particle size of the toner particles, resulting in a deterioration in the storage stability. If the amine value is greater than 150 mgKOH/g, then the chargeability of the toner particles may deteriorate, and the toner particles may become more difficult to transfer to the substrate, meaning a favorable image density cannot be obtained. Moreover, the solubility in the carrier liquid (D) may decrease, and the grindability may deteriorate. The amine value of the polymeric dispersant (C) refers to the total amine value (mgKOH/g) measured in accordance with the method prescribed in ASTM D2074.

(Ethylenically Unsaturated Monomer Having an Alkyl Group with a Carbon Number of 9 to 24)

In the ethylenically unsaturated monomer having an alkyl group with a carbon number of 9 to 24, the alkyl group with a carbon number of 9 to 24 has the effects of enhancing the solubility in the carrier liquid (D), improving the grindability of the toner particles during wet grinding, and inhibiting aggregation of the toner particles and any increase in the viscosity of the liquid developer during long-term storage, resulting in excellent storage stability. If the carbon number of the alkyl group is less than 9, then the solubility in the carrier liquid (D) decreases, and the dispersion stability and storage stability of the toner particles deteriorate. If the carbon number of the alkyl group is greater than 24, then during fixation of the liquid developer to the substrate, the long alkyl group inhibits contact and coalescence of the toner particles, and the friability deteriorates. Moreover, the chargeability of the toner particles deteriorates, which can cause problems such as difficulty in transferring the toner particles to the substrate, and inability to obtain satisfactory image density.

The alkyl group with a carbon number of 9 to 24 may have a substituent, and examples of the substituent include aromatic hydrocarbon groups such as a phenyl group, naphthyl group and biphenylyl group. The ethylenically unsaturated monomer represented by general formula (1) described below is not included within the ethylenically unsaturated monomer having an alkyl group with a carbon number of 9 to 24. Although the ethylenically unsaturated monomer represented by general formula (1) has a hydrocarbon group with a carbon number of 1 to 22, the ethylenically unsaturated monomer represented by general formula (1) is unable to yield the effects produced by the ethylenically unsaturated monomer having an alkyl group with a carbon number of 9 to 24.

Specific examples of the ethylenically unsaturated monomer having an alkyl group with a carbon number of 9 to 24 include:

(meth)acrylates, including alkyl (meth)acrylate having an alkyl group with a carbon number of 9 to 24, such as nonyl (meth)acrylate, 8-methylnonyl (meth)acrylate, 2-methylnonyl (meth)acrylate, decyl (meth)acrylate, 2-methyldecyl (meth)acrylate, undecyl (meth)acrylate, 2-methylundecyl (meth)acrylate, 9-methylundecyl (meth)acrylate, dodecyl (meth)acrylate, 2-methyldodecyl (meth)acrylate, 11-methyldodecyl (meth)acrylate, tridecyl (meth)acrylate, 2-methyltridecyl (meth)acrylate, tetradecyl (meth)acrylate, 2-methyltetradecyl (meth)acrylate, pentadecyl (meth)acrylate, 2-methylpentadecyl (meth)acrylate, hexadecyl (meth)acrylate, 2-methylhexadecyl (meth)acrylate, heptadecyl (meth)acrylate, 2-methylheptadecyl (meth)acrylate, octadecyl (meth)acrylate, 2-methyloctadecyl (meth)acrylate, nonadecyl (meth)acrylate, 2-methylnonadecyl (meth)acrylate, eicosyl (meth)acrylate, heneicosyl (meth)acrylate, docosyl (meth)acrylate, tertiary-butylcyclohexyl (meth)acrylate, dicyclopentanyl (meth)acrylate, dicyclopentanyloxyethyl (meth)acrylate and isobornyl (meth)acrylate;

alkyl (meth)acrylamides having an alkyl group with a carbon number of 9 to 24, such as N-nonyl (meth)acrylamide, N-(8-methylnonyl) (meth)acrylamide, N-decyl (meth)acrylamide, N,N-didecyl (meth)acrylamide, N-undecyl (meth)acrylamide, N-(1-methylundecyl) (meth)acrylamide, N-dodecyl (meth)acrylamide, N,N-didodecyl (meth)acrylamide, N-tridecyl (meth)acrylamide, N-(1-methyltridecyl) (meth)acrylamide, N-tetradecyl (meth)acrylamide, N,N-ditetradecyl (meth)acrylamide, N-pentadecyl (meth)acrylamide, N-(1-methylpentadecyl) (meth)acrylamide, N-hexadecyl (meth)acrylamide, N,N-dihexadecyl (meth)acrylamide, N-heptadecyl (meth)acrylamide-N-(1-methylheptadecyl) (meth)acrylamide, N-octadecyl (meth)acrylamide, N,N-dioctadecyl (meth)acrylamide, N-nonadecyl (meth)acrylamide, N-eicosyl (meth)acrylamide, N-heneicosyl (meth)acrylamide and N-docosyl (meth)acrylamide;

(meth)acrylates and (meth)acrylamides having an aromatic ring and an alkyl group with a carbon number of 9 to 24, such as 4-nonylphenyl (meth)acrylate, 4'-decyl-4-biphenylyl (meth)acrylate, 3-pentadecylphenyl (meth)acrylate, N-(10-phenyldecyl) (meth)acrylamide, N-(4-dodecylphenyl) (meth)acrylamide, N-[2-(1-naphthyl)ethyl]-N-dodecyl (meth)acrylamide, N-[4-(1-pyrenyl)butyl]-n-dodecyl (meth)acrylamide and N-octadecyl-N-[2-(1-naphthyl)ethyl] (meth)acrylamide; and α-olefins having an alkyl group with a carbon number of 9 to 24, such as 1-undecene, 1-dodecene, 2-dodecene, 1-tridecene, 2-tridecene, 1-tetradecene, 2-tetradecene, 4-tetradecene, 1-pentadecene, 2-pentadecene, 4-pentadecene, 1-hexadecene, 2-hexadecene, 4-hexadecene, 1-heptadecene, 2-heptadecene, 4-heptadecene, 1-octadecene, 2-octadecene, 4-octadecene, 1-docosene, 2-docosene and 4-docosene.

Among these compounds, from the viewpoint of dispersibility, a (meth)acrylate such as an alkyl (meth)acrylate having an alkyl group with a carbon number of 9 to 24 is preferable. Examples of the alkyl group with a carbon number of 9 to 24 include linear alkyl groups, branched alkyl groups and cyclic alkyl groups, but a linear alkyl group or branched alkyl group is preferred. Combinations of two or more different ethylenically unsaturated monomers having an alkyl group with a carbon number of 9 to 24 may also be used.

(Ethylenically Unsaturated Monomer Represented by General Formula (1))

In the polymeric dispersant (C), the ethylenically unsaturated monomer represented by general formula (1) is effective in improving the fixability. If the ethylenically unsaturated monomer represented by general formula (1) is not included, then the compatibility with the binder resin (A) deteriorates, and the melted state of the toner particles in the fixation process tends to be incomplete, resulting in a deterioration in the fixability to the substrate. Further, the cold offset phenomenon in which incompletely melted toner particles adhere to the thermocompression bonding roller and are then transferred to the next sheet of paper is more likely to occur.

The ethylenically unsaturated monomer represented by general formula (1) can be obtained, for example, by subjecting ethylene oxide to a ring-opening polymerization using an alkyl alcohol, and then subjecting the resulting product to a transesterification reaction with methyl (meth)acrylate or a reaction with (meth)acryloyl chloride.

$$CH_2=C(R^1)COO(AO)_nR^2 \quad \text{General formula (1)}$$

In the formula, $R^1$ represents H or $CH_3$, $R^2$ represents a hydrogen atom or a hydrocarbon group having a carbon number of 1 to 22, n represents an integer of 1 to 200, and A represents an alkylene group having a carbon number of 2 to 4.

In general formula (1), the alkylene oxide (AO) is an alkylene oxide having a carbon number of 2 to 4, and examples include an ethylene oxide group, propylene oxide group or butylene oxide group. Further, alkylene oxide groups having different carbon numbers may exist within the same monomer.

The number (n) of these alkylene oxide groups is an integer of 1 to 200, and preferably an integer of 1 to 30. If the value of n exceeds 200, then satisfactory compatibility with the aforementioned ethylenically unsaturated monomer having an alkyl group with a carbon number of 9 to 24 may be unobtainable.

$R^2$ represents a hydrogen atom or a hydrocarbon group having a carbon number of 1 to 22. If the carbon number is 23 or greater, the raw material becomes expensive, and is therefore impractical. Either substituted or unsubstituted groups may be selected as the hydrocarbon group having a carbon number of 1 to 22, but unsubstituted groups are preferable, and unsubstituted alkyl groups are preferred. Both groups having branching and groups with no branching may be used as the unsubstituted alkyl group. Combinations of two or more ethylenically unsaturated monomers represented by general formula (1) may also be used.

$R^2$ is preferably a hydrogen atom or a hydrocarbon group having a carbon number of 1 to 18.

Specific examples of compounds having an alkylene oxide chain include polyethylene glycol mono(meth)acrylate, polypropylene glycol mono(meth)acrylate, polybutylene glycol mono(meth)acrylate, poly(ethylene glycol-propylene glycol) mono(meth)acrylate, poly(ethylene glycol-tetramethylene glycol) mono(meth)acrylate, poly(propylene glycol-tetramethylene glycol) mono(meth)acrylate, polyethylene glycol mono(meth)acrylate monomethyl ether, polyethylene glycol mono(meth)acrylate monobutyl ether, polyethylene glycol mono(meth)acrylate monooctyl ether, polyethylene glycol mono(meth)acrylate monobenzyl ether, polyethylene glycol mono(meth)acrylate monophenyl ether, polyethylene glycol mono(meth)acrylate monodecyl ether, polyethylene glycol mono(meth)acrylate monododecyl ether, polyethylene glycol mono(meth)acrylate monotetradecyl ether, polyethylene glycol mono(meth)acrylate monohexadecyl ether, polyethylene glycol mono(meth)acrylate monooctadecyl ether, poly(ethylene glycol-propylene glycol) mono(meth)acrylate octyl ether, poly(ethylene glycol-propylene glycol) mono(meth)acrylate octadecyl ether, and poly(ethylene glycol-propylene glycol) mono(meth)acrylate nonylphenyl ether. Further, combinations of two or more these compounds may also be used.

(Other Copolymerizable Monomers)

Examples of other unsaturated compounds that may be included as polymerizable monomers include:

(meth)acrylates, including alkyl (meth)acrylates having an alkyl group with a carbon number of 1 to 8, such as methyl (meth)acrylate, ethyl (meth)acrylate, propyl (meth)acrylate, isopropyl (meth)acrylate, butyl (meth)acrylate, isobutyl (meth)acrylate, tertiary-butyl (meth)acrylate, pentyl (meth)acrylate, isoamyl (meth)acrylate, 2-ethylhexyl (meth)acrylate, heptyl (meth)acrylate, hexyl (meth)acrylate and octyl (meth)acrylate;

(meth)acrylamides such as N-methyl (meth)acrylamide, N-ethyl (meth)acrylamide, N-propyl (meth)acrylamide, N-butyl (meth)acrylamide, N-tert-butyl (meth)acrylamide, N-isopentyl (meth)acrylamide, N-neopentyl (meth)acrylamide, N-hexyl (meth)acrylamide, N-isohexyl (meth)acrylamide, N-n-heptyl (meth)acrylamide, N-(6-methylheptyl) (meth)acrylamide, N-octyl (meth)acrylamide and N-(7-methyloctyl) (meth)acrylamide; and α-olefins having an alkyl group with a carbon number of 1 to 8, such as 1-butene, 2-butene, 1-pentene, 2-pentene, 1-hexene, 2-hexene, 4-ethyl-2-hexene, 1-heptene, 2-heptene, 1-octene, 2-octene, 1-nonene, 2-nonene, 1-decene and 2-decene.

Additional examples include:

cyclic alkyl (meth)acrylates such as cyclohexyl (meth)acrylate, dicyclopentenyl (meth)acrylate and dicyclopentenyloxyethyl (meth)acrylate;

(meth)acrylates having an aromatic ring such as benzyl (meth)acrylate; and vinyl compounds such as styrene, α-methylstyrene, vinyl acetate, vinyl (meth)acrylate and allyl (meth)acrylate.

Other unsaturated compounds besides those listed above can also be used, provided they do not impair the physical properties.

Although the weight-average molecular weight (Mw) of the polymeric dispersant (C) is not limited to a specific range, if the dispersibility and grindability during wet grinding of the toner particles are taken into consideration, then the molecular weight measured by gel permeation chromatography (GPC) is preferably from 500 to 40,000, and more preferably from 2,000 to 30,000. The weight-average molecular weight (Mw) can be measured using the method described above.

The polymeric dispersant (C) is preferably added in an amount of 0.1 to 10 parts by mass, and more preferably 0.1 to 5 parts by mass, per 100 parts by mass of the liquid developer. If the amount is less than 0.1 parts by mass, then the dispersibility and grindability of the toner particles may deteriorate, and the storage stability may also deteriorate. The dispersibility and grindability of the toner particles can also be improved by modifying the dispersion method or lengthening the dispersion time, but these techniques tend to cause an increase in the viscosity of the liquid developer, and may sometimes cause a deterioration in the transferability and color development properties. If the amount added is greater than 10 parts by mass, then a variety of other problems may arise, including a deterioration in the chargeability of the toner particles, an inability to obtain satisfactory image density and a deterioration in the fixability. When the toner particles include the polymeric dispersant (C), the above range for the amount of the polymeric dispersant (C) includes the amount of the polymeric dispersant (C) contained within the toner particles.

(Other Dispersants)

In addition to the polymeric dispersant (C) used in the present invention, other dispersants conventionally used in liquid developers may also be used as dispersants. Specific examples include metal salts of fatty acids such as cobalt naphthenate, zinc naphthenate, copper naphthenate, manganese naphthenate, cobalt octylate and zirconium octylate, lecithin, titanate coupling agents composed of organic titanates such as titanium chelates, alkoxytitanium polymers, polyhydroxytitanium carboxylate compounds, titanium alkoxides, succinimide compounds, polyimine compounds, fluorine-containing silane compounds and pyrrolidone-based compounds. Among these, titanium alkoxides, succinimide compounds, fluorine-containing silane compounds, and pyrrolidone-based compounds and the like may be mixed in appropriate amounts of not more than 5 parts by mass per 100 parts by mass of the liquid developer.

In such cases, among the configurations in which dispersants are used, dispersants which adopt the same polarity as the toner particles adsorb to the toner particles, whereas dispersants which adopt the opposite polarity to the toner particles are not adsorbed to the toner particles, but are rather dispersed within the carrier liquid. The standard that defines the polarity in these cases is the polarity relative to the carrier liquid. Further, this behavior is ascertained by performing actual imaging tests, and is obtained experimentally.

(Carrier Liquid (D))

The carrier liquid (D) used in the liquid developer is preferably an aliphatic hydrocarbon. Examples of this aliphatic hydrocarbon include linear paraffin-based hydrocarbons, isoparaffin-based hydrocarbons and naphthene-based hydrocarbons. Among these, paraffin-based hydrocarbons for which the amount of residual aromatic hydrocarbons is extremely small are preferred. Further, compounds having lipophilicity and chemically stable insulating properties are preferable. Furthermore, the carrier liquid is preferably chemically inert relative to the substances and devices used in the image forming apparatus, and particularly the members used in the developing process such as the photoreceptor and the surrounding members.

The dry point in the distillation range of the carrier liquid (D) is preferably within a range from 200 to 360° C., and more preferably within a range from 240 to 340° C. If the dry point is lower than 200° C., then the liquid developer may dry at normal temperatures, causing the precipitation of solid matter, and fixation may occur on the control blades in the vicinity of the development, resulting in image contamination. Further, if the dry point is higher than 360° C., then removal of the carrier liquid (D) becomes difficult, and the fixability may sometimes deteriorate.

The dry point in the distillation range is determined using the method prescribed in ASTM D86, ASTM D1078, JIS K2254.

For the carrier liquid (D), the use of a compound for which the Kauri-Butanol value (KB value: ASTM D1133) is 30 or less is preferred, and a KB value within a range from 20 to 30 is particularly preferable. Further, the aniline point (JIS K2256) is preferably within a range from 60 to 105° C., and more preferably from 70 to 95° C., as this ensures that a more stable carrier liquid can be obtained.

If the Kauri-Butanol value exceeds 30 or the aniline point is lower than 60° C., then the dissolving power of the solvent is high, and the carrier liquid may dissolve the toner particles, which can cause various problems including a deterioration in the storage stability and color reproducibility of the toner particles, and coloration of the carrier liquid that can cause contamination of the substrate such as the paper. If the aniline point exceeds 105° C., then the compatibility with the dispersants and additives and the like added during dispersion of the toner particles in the carrier liquid tends to deteriorate, and problems such as poor dispersion and an inability to obtain satisfactory image density may arise.

In terms of specifying the insulating properties of the carrier liquid (D), the dielectric constant is typically not more than 5, preferably from 1 to 5, and more preferably from 1 to 3.

Further, at the same time, the electrical resistivity of the carrier liquid (D) is preferably $10^9$ Ω·cm or greater, more preferably $10^{10}$ Ω·cm or greater, and most preferably within a range from $10^{10}$ to $10^{16}$ Ω·cm. Here, the electrical resistivity can be measured using a combination of a Universal Electrometer MMA-II-17D and an electrode for liquids LP-05 manufactured by Kawaguchi Electric Works Co., Ltd. If the electrical resistivity is less than $10^9$ Ω·cm, then the chargeability of the toner particles may deteriorate, meaning satisfactory image density cannot be obtained, and the color reproducibility and color development properties may also deteriorate.

Moreover, the viscosity of the carrier liquid (D) at 15° C. (JIS K2249) is preferably within a range from 0.67 to 0.9 g/cm$^3$, and more preferably within a range from 0.70 to 0.85 g/cm$^3$. This range is preferred in terms of enabling the toner particles and the dispersant to exist in a stable manner, and enabling excellent fixability and image density to be obtained.

Further, the carrier liquid (D) has a kinematic viscosity (ASTM D445) that is preferably within a range from 1 to 25 mm$^2$/s and more preferably within a range from 3 to 15 mm$^2$/s. This range is preferred in terms of enabling movement of the charged particles during developing, and yielding satisfactory volatility, which enables the carrier liquid to be easily removed in the fixation step from the substrate on which the final image has been formed.

If the kinematic viscosity is less than 1 mm$^2$/s, then because the viscosity of the liquid developer decreases, the transferability to the developing roller deteriorates, and satisfactory image density may sometimes be unobtainable. Moreover, because the toner particles are more easily moved after developing, there is an increased likelihood that the image definition may be adversely affected. Further, if the kinematic viscosity is greater than 25 mm$^2$/s, then favorable fluidity cannot be obtained for the toner particles, electrophoresis is less likely to occur, and a satisfactory image density may be unobtainable. Moreover, the penetration into the substrate such as paper is poor, removing the carrier liquid during fixing of the toner particles becomes difficult, and satisfactory fixability may not be obtainable. The fixability tends to deteriorate particularly markedly for superimposed images.

Specific examples of preferred carrier liquids (D) include branched paraffin solvent mixtures, and particularly isoparaffin-based hydrocarbons, such as the product Isopar™ M (manufactured by Exxon Mobil Corporation), and naphthene-based hydrocarbons such as Exxsol™ D110 and Exxsol™ D130 (manufactured by Exxon Mobil Corporation).

(Other Additives)

(Pigment Dispersant)

Examples of pigment dispersants that can be included internally within the toner particles include polyamine-based resin dispersants such as Solsperse 24000SC and Solsperse 32000 (manufactured by Avecia Ltd.) and AJISPER PB821 (manufactured by Ajinomoto Fine-Techno Co., Inc.); and acrylic copolymer resin dispersants such as BYK-116 (manufactured by BYK-Chemie GmbH). Particularly in those cases where production is performed using a color masterbatch having a high pigment concentration, addition of a pigment dispersant during production of the masterbatch is preferable.

In terms of improving the dispersibility of the toner particles, the amount added of the pigment dispersant is preferably at least 3 parts by mass, and more preferably 5 parts by mass or greater, per 100 parts by mass of the colorant (B). Further, in terms of improving the grindability and productivity of the toner particles, the amount of the pigment dispersant is preferably not more than 40 parts by mass, and more preferably 30 parts by mass or less, per 100 parts by mass of the colorant (B).

(Colorant Derivative)

Colorant derivatives may be used in the toner particles, provided they do not impair the color development properties of the colorant (B).

Examples of colorant derivatives include compounds in which a basic substituent, an acidic substituent or a phthalimidomethyl group that may have a substituent is introduced into an organic colorant (organic pigment or organic dye), anthraquinone, an acridone or a triazine.

Among such compounds, pigment derivatives are preferred, and the structure of such compounds is represented by general formula (3) shown below.

P-Ln  General formula (3)

P represents an organic pigment residue, anthraquinone residue, acridone residue or triazine residue, L represents a basic substituent, acidic substituent, or a phthalimidomethyl group that may have a substituent, and n represents an integer of 1 to 4.

Examples of the organic pigments that constitute the organic pigment residue for P include diketopyrrolopyrrole-based pigments; azo-based pigments such as azo, disazo and polyazo pigments; phthalocyanine-based pigments such as copper phthalocyanine, halogenated copper phthalocyanine and metal-free phthalocyanine; anthraquinone-based pigments such as aminoanthraquinone, diaminodianthraquinone, anthrapyrimidine, flavanthrone, anthanthrone, indanthrone, pyranthrone and violanthrone; as well as quinacridone-based pigments, dioxazine-based pigments, perinone-based pigments, perylene-based pigments, thioindigo-based pigments, isoindoline-based pigments, isoindolinone-based pigments, quinophthalone-based pigments, threne-based pigments, and metal complex-based pigments.

Examples of colorant derivatives that may be used include those disclosed in JP 63-305173 A, JP 57-15620 B, JP 59-40172 B, JP 63-17102 B and JP 05-9469 B. These colorant derivatives may be used individually, or combinations of two or more colorant derivatives may be used.

In terms of the improvement in the dispersibility, the amount added of the colorant derivative is preferably at least 0.5 parts by mass, and more preferably 1 part by mass or greater, per 100 parts by mass of the colorant. Further, in terms of the heat resistance and light resistance, the amount is preferably not more than 4 parts by mass, and more preferably 1.5 parts by mass or less, per 100 parts by mass of the colorant.

The ideal amount of the colorant derivative in the liquid developer varies depending on the type of colorant (B) that is used, but is generally within a range from 0.1 parts by mass to 30 parts by mass per 100 parts by mass of the colorant (B). This ensures that the dispersion stability of the toner particles is maintained, and that the stability of the charging polarity of the toner particles can be maintained.

In the liquid developer, the toner particles have positive charging characteristics, and therefore the use of a basic colorant derivative is preferred.

(Charge Control Agent)

If required, the toner particles within the liquid developer may include a colorless or light-colored charge control agent, provided there is no adverse effect on the color tone. The charge control agent may be either a positive charge control agent or a negative charge control agent depending on the polarity of the electrostatically charged image on the electrostatic latent image support that is to be developed.

In the liquid developer, the toner particles preferably adopt a positive charge, and therefore a positive charge control agent is typically used.

Examples of positive charge control agents include quaternary ammonium salt compounds (such as tributylbenzylammonium-1-hydroxy-4-naphthosulfonate and tetrabutylbenzylammonium tetrafluoroborate), organotin oxides (such as dibutyltin oxide, dioctyltin oxide and dicyclohexyltin oxide), diorganotin borates (such as dibutyltin borate, dioctyltin borate and dicyclohexyltin borate), and electron donor substances such as amino group-containing polymers. These positive charge control agents may be used individually, or combinations of two or more charge control agents may be used. Further, the aforementioned triarylmethane-based colorants can also be used as positive charge control agents in a similar manner.

Furthermore, instead of using an aforementioned positive charge control agent, a resin-based charge control agent may also be used.

For example, in the case of a positive charge, a styrene-acrylic-based polymer represented by a general formula shown below and obtained by copolymerization of a quaternary ammonium salt as a functional group with a styrene-acrylic resin may be used.

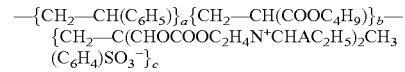

(wherein the polymer contains 3 to 35 parts by mass of the quaternary ammonium salt units and 97 to 65 parts by mass of the styrene and acrylic units, with the values of a, b and c determined accordingly)

Specific examples include 2-ethylhexyl acrylate/acryloylamino-2-methyl-1-propanesulfonic acid/styrene copolymers and butyl acrylate/N,N-diethyl-N-methyl-2-(meth-acryloyloxy)ethylammonium p-toluenesulfonate/styrene copolymers. These polymers are colorless and transparent, and are therefore ideal for use in color toners. Further, the resin-based charge control agent is preferably added in an amount of 1.0 to 20 parts by mass, and more preferably 2.0 to 8 parts by mass, per 100 parts by mass of the binder resin (A).

(Production Method)

The production method for the liquid developer is described below.

The liquid developer is preferably obtained, for example, by performing the five processes described below.

(1) Preparation of Color Masterbatch for Toner Particles

The binder resin (A) and the colorant (B) are kneaded using hot rollers or the like in a ratio that yields a concentration of the colorant (B) within the masterbatch of 10 to 60 parts by mass, and following cooling, coarse grinding is performed to obtain a color masterbatch. Further, in addition to the binder resin (A) and the colorant (B), a pigment dispersant or a colorant derivative or the like may also be added.

(2) Preparation of Chips for Toner Particles (Dilution of Color Masterbatch)

The color masterbatch obtained in (1) and the binder resin (A) are mixed and preliminarily dispersed using a mixer such as a super mixer, and melt kneading is then performed to dilute and disperse the color masterbatch within the binder resin (A), thus obtaining chips for the toner particles. When the preliminary dispersion and melt kneading are performed, a pigment dispersant, the polymeric dispersant (C), or a charge control agent or the like may be added to the mixture. The chips for the toner particles are then preferably ground coarsely using a hammer mill or a sample mill or the like to reduce the particle size to 10 mm or less.

Further, the processes (1) and (2) may be combined, and in such a case, the color masterbatch process of (1) is not performed, and in the process (2), all of the materials are added at the time of the preliminary dispersion when preparing the chips for the toner particles. The melt kneading can be performed using a conventional kneading device such as a pressurized kneader, Banbury mixer, or a uniaxial or biaxial extruder.

(3) Dry Grinding of Toner Particles

The chips for the toner particles obtained in (2) are finely ground to reduce the average particle size to 7 μm or less. Usually, this fine grinding is preferably performed using a jet stream grinder such as a jet mill, or a mechanical grinder such as a turbo mill or a Krypton.

(4) Wet Grinding of Toner Particles

The dry-ground toner particles obtained in (3) are dispersed in a solvent having the same composition as the carrier liquid (D), and a wet grinder (dispersion device) is used to perform grinding of the toner particles to obtain an average particle size within a range from 0.5 to 4 μm, and preferably 1 to 3 μm. Furthermore, at this time, the addition of the polymeric dispersant (C) that has the function of adsorbing to the toner particles is also effective. By performing this wet grinding and dispersion process, the dispersant is adsorbed within the toner particles and the charging characteristics are stabilized.

When performing the wet grinding (dispersion), cooling is preferably performed so that the temperature during grinding does not exceed 50° C. If the temperature exceeds 50° C., then the toner particles may melt and adhere, making control of the particle size distribution impossible.

Examples of wet grinders that can be used for performing the wet grinding of the toner particles include devices that use a grinding medium, such as container-driven medium mills or medium-agitation mills. Specific examples of container-driven medium mills include a tumbling ball mill, vibrating ball mill, planetary ball mill and centrifugal fluid mill, whereas examples of medium-agitation mills include a tower mill, agitation tank mill, distribution tank mill (horizontal or vertical) and annular mill.

Micronization of the toner particles by wet grinding is possible in any of the devices mentioned above, but among the devices mentioned, medium-agitation mills are preferred in terms of productivity, grinding capability, and control of the particle size distribution. Moreover, among such devices, the use of a wet grinder that can be classified as a horizontal distribution tank mill, which is a closed system, is positioned horizontally and is filled with micro beads as the medium, is preferred in terms of enabling more precise wet grinding and dispersion to be achieved.

Specific examples include the Dyno-Mill manufactured by WAB AG (Shinmaru Enterprises Corporation), and a sand mill. In horizontal wet grinders, the dispersion media is essentially unaffected by gravity, and therefore a close-to-ideal uniform distribution can be obtained inside the grinder. Further, because these grinders have a completely closed structure, foaming and a loss of balance due to solvent evaporation can be avoided, meaning a more stable grinding process is possible.

In the wet grinder, examples of factors which significantly influence the grinding properties include the type of grinding media used, the particle size of the grinding media, the fill rate of the dispersion media inside the grinder, the type of agitator discs used, the solution concentration of the sample being ground, and the type of solvent used. Among these, the type of grinding media used and the particle size of the grinding media contribute significantly to the grindability.

The type of grinding media used may be selected in accordance with factors such as the viscosity and the specific gravity of the toner particles, and the particle size desired following grinding and dispersion, and examples of grinding media that can be used include glass beads ($SiO_2$: 70 to 80%, NaO: 12 to 16%), zircon beads ($ZrO_2$: 69%, $SiO_2$: 31%), zirconia beads ($ZrO_2$: at least 95%), alumina ($Al_2O_3$: at least 90%), titania ($TiO_2$: 77.7%, $Al_2O_3$: 17.4%) and steel balls. Among these, in order to achieve more favorable grinding properties, the use of zirconia beads or zircon beads is preferable.

Further, grinding media having a particle size (diameter) within a range from 0.1 mm to 3.0 mm can be used, and grinding media having a particle size within a range from 0.3 to 1.4 mm are preferred. If the particle size is less than 0.1 mm, then the load inside the grinder increases, and the heat that is generated may cause the toner particles to melt, making grinding impossible. Further, if the particle size exceeds 3.0 mm, then satisfactory grinding may sometimes not be possible. The fill rate of the dispersion media is preferably from 40 to 85% by mass. If the fill rate exceeds 85% by mass, then the load inside the grinder increases, and the heat that is generated may cause the toner particles to melt, making grinding impossible. Further, if the fill rate is less than 40% by mass, then the grinding efficiency deteriorates, and micronization of the toner particles may become difficult to achieve. Further, when the concentration of the toner particles in the slurry is high (a concentration of 40 to 50% by mass), the fill rate is preferably from 40 to 70% by mass.

The agitator discs inside the wet grinder also have an effect in controlling the grindability. The speed of the discs is preferably from 4 to 16 m/s. If the speed is less than 4 m/s, then the grinding takes considerable time, whereas if the speed exceeds 16 m/s, then contact with the grinding media causes heat generation, which may sometimes cause melting and adhering of the toner particles. Examples of the material for the agitator discs include hardened steel, stainless steel, alumina, zirconia, polyurethane, polyethylene and engineering plastics, and among these, the use of zirconia is preferable.

Further, examples of the material for the grinding cylinder that constitutes the inner walls of inside wet grinder include special hardened steel, stainless steel, alumina, zirconia, ZTA, glass and polyethylene. Among these, the use of zirconia toughened alumina ceramic, known as ZTA, is preferable.

(5) Preparation of Liquid Developer

The carrier liquid (D), and if necessary a dispersant, are added to and mixed with the material obtained in (4) containing the wet-ground toner particles (which contain at least the binder resin (A) and the colorant (B)), the carrier liquid (D) and the dispersant, and the concentration of the toner particles is then controlled to complete preparation of the liquid developer.

The polymeric dispersant (C) may be added in any of processes (1) to (5), but by adding the polymeric dispersant (C) together with the carrier liquid (D) that is added to the material obtained in process (4), a liquid developer can be obtained in which the toner particles are dispersed in a stable state.

(Physical Properties of Liquid Developer)

The toner particles preferably have an average particle size (D50) of 0.5 to 4 µm, and more preferably 1 to 3 µm. In the present invention, the particle size is measured using a laser diffraction/scattering particle size analyzer Microtrac HRA manufactured by Nikkiso Co., Ltd., and the average particle size (D50) represents the particle size at 50% in the cumulative distribution.

Further, in terms of the developing properties required for obtaining favorable color development, it is preferable that the proportion of toner particles having a particle size of 2 µm or less is not more than 50% by volume of all the toner particles, that the proportion of toner particles having a particle size of 1 to 3 µm is from 5 to 60% by volume, and that the proportion of toner particles having a particle size of 5 µm or greater is not more than 35% by volume. If the proportion of toner particles having a particle size of 2 µm or less is greater than 50% by volume, then the adsorption of the polymeric dispersant (C) to the toner particles may deteriorate, and superior storage stability may sometimes be unobtainable. Moreover, the grindability of the toner particles during wet grinding also deteriorates, and controlling the viscosity of the liquid developer may become problematic. If the proportion of toner particles having a particle size of 5 µm or greater is greater than 35% by volume, then this may cause problems such as an inability to obtain satisfactory image density, and a deterioration in the color development and color reproducibility. Further, ensuring that the toner particles contain 5 to 60% by volume of particles having a particle size of 1 to 3 µm is preferable in terms of obtaining favorable dispersion stability of the toner particles and excellent storage stability over long periods.

The concentration of the toner particles within the liquid developer is preferably from 10 to 30% by mass, and more preferably from 12 to 25% by mass, relative to a value of 100% by mass for the entire liquid developer. If this concentration is less than 10% by mass, then removal of the carrier liquid (D) may become difficult, and the fixability of the toner particles may sometimes deteriorate. If the concentration is greater than 30% by mass, then the viscosity of the liquid developer may increase, the mobility of the toner particles may deteriorate, and satisfactory image density may not be obtainable. Moreover, cohesion between the toner particles may increase, resulting in a deterioration in the storage stability.

In the liquid developer, the polymer dispersion and adsorption rate of the polymeric dispersant (C) to the toner particles is defined as follows, and is measured in the manner described below.

Adsorption Rate=(amount of dispersant adsorbed to toner particles)/(amount of dispersant within liquid developer)

Ten grams of the liquid developer is weighed, and a centrifuge CR22H manufactured by Hitachi Koki Co., Ltd. is used to perform a centrifugal separation at 19,000 rpm for 20 minutes. One gram of the separated supernatant is weighed, and is then placed in an oven at 160° C. for one hour to evaporate the carrier liquid (D). The residual polymeric dispersant (C) is weighed, and the thus obtained value is used to calculate the adsorption rate to the toner particles.

The adsorption rate is preferably at least 50%, and more preferably 70% or greater. If the adsorption rate is less than 50%, then the dispersion stability of the toner particles deteriorates, and long-term storage may cause increases in the average particle size and the viscosity of the liquid developer, meaning stable color development and color reproducibility cannot be obtained.

In order to ensure that the adsorption rate of the polymeric dispersant (C) to the toner particles is at least 50%, it is preferable to control the amine value of the polymeric dispersant (C), the carbon number of the alkyl group of the ethylenically unsaturated monomer having an alkyl group, and the carbon number of the alkylene oxide (AO), the number of alkylene oxide groups and the carbon number of $R^2$ in the monomer represented by general formula (1), as well as controlling the mass ratio between the monomers.

The viscosity ($\eta$) of the liquid developer of the present embodiment is preferably from 5 to 180 mPa·s, and the electrical resistivity of the liquid developer is preferably from $10^{10}$ to $10^{15}$ Ω·cm.

The viscosity ($\eta$) of the liquid developer can be measured, for example, using an E-type viscometer TV-22 or the like manufactured by Told Sangyo Co., Ltd. The viscosity is determined by adjusting the solid fraction within the liquid developer to 25%, thoroughly blending the sample at 25° C., installing a 1° 34' cone in the TV-22 viscometer, and measuring the viscosity after agitation at 20 rpm for one minute. If the viscosity ($\eta$) is less than 5 mPa·s, then the developed image lacks definition, whereas if the viscosity exceeds 180 mPa·s, then the mobility of the toner particles during developing may deteriorate, which can cause problems such as an inability to perform high-speed developing, and an inability to achieve satisfactory image density.

The electrical resistivity can be measured using the same measurement method as that described above for the carrier liquid. If the electrical resistivity is $10^{10}$ Ω·cm or less, then it tends to become difficult to retain the electrostatic latent image on the photoreceptor.

A developing process that can be used favorably when using the liquid developer involves supplying the liquid developer to a developing roller formed from a conductive rubber, performing pre-transfer discharge using an amorphous silicon photoreceptor that has undergone LED exposure, and then performing developing via an intermediate transfer body. The photoreceptor preferably has a surface potential of +450 to 550 V and a residual potential of not more than +50 V, and the bias applied to the developing roller is preferably within a range from +250 to 450 V.

There are no particular limitations on the printing substrate onto which the printing is performed using the developer, and examples include typical high-quality papers, coated papers, PET sheets, and PP sheets and the like. The coated papers include all of the extensive range of coated papers used in all manner of conventional applications, and specific examples include finely coated papers, lightweight coated papers, coated papers, art papers, matte coated papers and cast coated papers, and there are no limitations on the thickness or shape of these papers. Using the liquid developer of the present embodiment, particularly with coated papers, enables good image quality to be obtained, and sharp text and barcodes can be printed. The surfaces of these printing substrates may be either smooth or rough, and may be transparent, semi-transparent or opaque. Further, substrates in which two or more of these printing substrates have been bonded together may also be used. Moreover, a releasable adhesive layer may be provided on the opposite surface to the printing surface, or an adhesive layer or the like may be provided on the printed surface following printing.

There are no particular limitations on the printed matter that is printed using the liquid developer, and the printed matter can be used for typical commercial applications, paper packaging, packaging films, seals, or label applications or the like. Examples of the typical commercial applications include publications or documents such as catalogs or magazines which use high-quality paper or coated paper or the like, examples of the paper packaging include packaging containers and boxes which use coated paper or cardboard or the like, whereas examples of the packaging films include flexible packaging containers which use a PET sheet or PP sheet or the like.

EXAMPLES

The present invention is described below in further detail using a series of examples, but the present invention is in no way limited by these examples. In the following description, unless specifically stated otherwise, the units "parts" indicate "parts by mass".

The materials listed below were used in the examples.

Binder Resin Synthesis Example 1

A flask fitted with a reflux condenser, a distillation column, a nitrogen gas inlet, a thermometer and a stirrer was charged with the polyhydric alcohols and polybasic acids shown in Table 1, and 2 parts of dibutyltin oxide as a catalyst, nitrogen gas was introduced while the contents were stirred, and the contents were then heated to 200° C. and reacted for 4 hours while this reaction system temperature was maintained. The contents were then reacted for a further one hour under reduced pressure. The reaction system was then returned to normal pressure, the temperature of the reaction system was reduced to 100° C. or lower, and the polycondensation was halted, thus obtaining a polyester resin as the binder resin 1.

TABLE 1

| Composition | Bisphenol A propylene oxide adduct | 480 parts |
|---|---|---|
| | Bisphenol A ethylene oxide adduct | 200 parts |
| | Terephthalic acid | 270 parts |
| | Trimellitic acid | 50 parts |

Bisphenol A propylene oxide adduct: a compound of general formula (2) wherein R represents a propylene group, and x=y=2.

Bisphenol A ethylene oxide adduct: a compound of general formula (2) wherein R represents an ethylene group, and x=y=2.

Binder Resin Synthesis Example 2

In a similar manner to Synthesis Example 1, a flask was charged with the polyhydric alcohols and polybasic acids shown in Table 2, and 2 parts of dibutyltin oxide as a catalyst, nitrogen gas was introduced while the contents were stirred, and the contents were then heated to 180° C. and reacted for 7 hours while this reaction system temperature was maintained. The contents were then reacted for a further one hour under reduced pressure. The reaction system was then returned to normal pressure, the temperature of the reaction system was reduced to 100° C. or lower, and the polycondensation was halted, thus obtaining a polyester resin as the binder resin 2.

TABLE 2

| Composition | Bisphenol A propylene oxide adduct | 500 parts |
|---|---|---|
| | Bisphenol A ethylene oxide adduct | 150 parts |
| | Terephthalic acid | 120 parts |
| | Fumaric acid | 100 parts |
| | Trimellitic acid | 90 parts |

Binder Resin Synthesis Example 3

The obtained binder resin 1 was added to an equal amount of toluene and dissolved by heating. Nitrogen gas was then introduced under stirring, the solution was heated further to the boiling point of toluene, and a solution polymerization was performed by adding, in a dropwise manner over a period of two hours, a mixed solution shown in Table 3, containing the styrene-based monomer, the acrylate esters and di-t-butyl peroxide as a polymerization initiator. Following completion of the dropwise addition, reaction was continued for a further two hours at the boiling point of toluene, and a further 1 part of di-t-butyl peroxide was then added to halt the polymerization. The temperature was then raised to 180° C. to remove the toluene, thus obtaining a binder resin 3 containing a polyester resin and a styrene-acrylic copolymer resin.

Binder Resin Synthesis Examples 4 and 5

With the exceptions of using the raw materials and the amounts shown in Table 3, synthesis was performed in the same manner as Synthesis Example 3 to obtain binder resins 4 and 5.

TABLE 3

| | | Binder resin 3 | Binder resin 4 | Binder resin 5 |
|---|---|---|---|---|
| Composition | Binder resin 1 | 800 parts | 700 parts | 750 parts |
| | Styrene | 115 parts | 297 parts | 0 parts |
| | 2-ethlyhexyl acrylate | 62 parts | 0 parts | 62 parts |
| | n-butyl acrylate | 20 parts | 0 parts | 185 parts |
| | di-t-butyl peroxide | 3 parts | 3 parts | 3 parts |

Binder Resin Synthesis Examples 6 to 9

With the exceptions of using the raw materials and the amounts shown in Table 4, synthesis was performed in the same manner as Synthesis Example 1 to obtain binder resins 6 to 9.

TABLE 4

| Composition - Reaction conditions | Binder resin 6 | Binder resin 7 | Binder resin 8 | Binder resin 9 |
|---|---|---|---|---|
| Bisphenol A propylene oxide adduct | 400 parts | 400 parts | 300 parts | 420 parts |
| Bisphenol A ethylene oxide adduct | 200 parts | 200 parts | 300 parts | 200 parts |
| Terephthalic acid | | 130 parts | 110 parts | 100 parts |
| Fumaric acid | 230 parts | 100 parts | 170 parts | 80 parts |
| Trimellitic acid | 20 parts | 50 parts | | 80 parts |
| Reaction temperature | 200° C. | 200° C. | 220° C. | 180° C. |
| Reaction time | 4 hours | 4 hours | 2 hours | 10 hours |

The physical properties of the obtained binder resins 1 to 9 are shown in Table 5.

TABLE 5

| Binder resin | Softening temperature (T4) | Weight-average molecular weight (Mw) | Mass ratio (a-2)/(a-1) |
|---|---|---|---|
| Binder resin 1 | 112° C. | 11,000 | — |
| Binder resin 2 | 134° C. | 42,000 | — |
| Binder resin 3 | 120° C. | 12,800 | 0.24 |
| Binder resin 4 | 140° C. | 10,500 | 0.42 |
| Binder resin 5 | 90° C. | 14,000 | 0.33 |
| Binder resin 6 | 70° C. | 4,100 | — |
| Binder resin 7 | 154° C. | 48,000 | — |
| Binder resin 8 | 82° C. | 1,800 | — |
| Binder resin 9 | 136° C. | 120,000 | — |

Polymeric Dispersant Synthesis Example 1

A reactor fitted with a nitrogen gas inlet, a thermometer, a condenser and a stirrer was charged with 90.1 parts of Exxsol D110 (a naphthene-based hydrocarbon solvent, manufactured by Exxon Mobil Corporation), and the atmosphere inside the reactor was replaced with nitrogen gas. The temperature inside the reactor was raised to 110° C., and a polymerization was performed by adding, in a dropwise manner over a period of 2 hours, a mixture containing 20.0 parts of N,N-dimethylaminoethyl methacrylate, 60.0 parts of stearyl methacrylate, 20.0 parts of polyethylene glycol mono (meth)acrylate monomethyl ether (a compound of general formula (1) wherein $R^1$ represents $CH_3$, $R^2$ represents $CH_3$, n=9, and A represents an ethylene group) and 9.0 parts of dimethyl 2,2'-azobis(2-methylpropionate) (V-601, manufactured by Wako Pure Chemical Industries, Ltd.) as a polymerization initiator. Following completion of the dropwise addition, reaction was continued at 110° C. for a further 3 hours, 0.9 parts of V-601 (manufactured by Wako Pure Chemical Industries, Ltd.) was added, and reaction was continued at 110° C. for a further one hour, thus obtaining a solution of a polymeric dispersant 1. The weight-average molecular weight (Mw) of the polymeric dispersant 1 was 7,000.

A 1 g sample of the solution was dried by heating at 180° C. for 20 minutes, and the non-volatile fraction was measured. Exxsol D110 was added to the solution of the polymeric dispersant 1 to adjust the non-volatile fraction of the polymeric dispersant solution to 50% by mass. This yielded a solution of the polymeric dispersant 1 with a non-volatile fraction of 50% by mass.

Polymeric Dispersant Synthesis Examples 2 to 8

With the exceptions of using the raw materials and the amounts shown in Table 6, synthesis was performed in the same manner as Synthesis Example 1 to obtain polymeric dispersants 2 to 8. The amine value and weight-average molecular weight of each of these polymeric dispersants were as shown in Table 7.

Comparative Polymeric Dispersant Synthesis Examples 1 to 3

With the exceptions of using the raw materials and the amounts shown in Table 6, synthesis was performed in the same manner as Synthesis Example 1 to obtain comparative polymeric dispersants 1 to 3. The amine value and weight-average molecular weight of each of these polymeric dispersants were as shown in Table 7.

TABLE 6

| | In reactor Exxsol D110 | Dropwise addition mixture | | | | | | | | | | After reaction for 3 hours |
|---|---|---|---|---|---|---|---|---|---|---|---|---|
| | | DM | DMAPAA | STMA | LMA | C-1 | C-2 | C-3 | C-4 | C-5 | 2-EHA | V-601 | V-601 |
| Polymeric dispersant 1 | 90.10 | 20 | | 60 | 20 | | | | | | | 9 | 0.90 |
| Polymeric dispersant 2 | 90.10 | 20 | | 40 | 40 | | | | | | | 9 | 0.90 |
| Polymeric dispersant 3 | 90.10 | 20 | | 60 | | 20 | | | | | | 9 | 0.90 |
| Polymeric dispersant 4 | 90.10 | 20 | | 60 | | | 20 | | | | | 9 | 0.90 |

TABLE 6-continued

| | In reactor Exxsol D110 | Dropwise addition mixture | | | | | | | | | | | After reaction for 3 hours |
|---|---|---|---|---|---|---|---|---|---|---|---|---|---|
| | | DM | DMAPAA | STMA | LMA | C-1 | C-2 | C-3 | C-4 | C-5 | 2-EHA | V-601 | V-601 |
| Polymeric dispersant 5 | 90.10 | 20 | | 60 | | | | 20 | | | | 9 | 0.90 |
| Polymeric dispersant 6 | 90.10 | 20 | | 60 | | | | | 20 | | | 9 | 0.90 |
| Polymeric dispersant 7 | 94.50 | 10 | | | 80 | 10 | | | | | | 5 | 0.50 |
| Polymeric dispersant 8 | 83.50 | 20 | | 60 | 20 | | | | | | | 15 | 1.50 |
| Polymeric dispersant 9 | 99.45 | 20 | | 60 | 20 | | | | | | | 0.5 | 0.05 |
| Polymeric dispersant 10 | 90.10 | | 20 | 60 | 20 | | | | | | | 9 | 0.90 |
| Polymeric dispersant 11 | 90.10 | 50 | | 40 | 10 | | | | | | | 9 | 0.90 |
| Comparative polymeric dispersant 1 | 90.10 | 20 | | 80 | | | | | | | | 9 | 0.90 |
| Comparative polymeric dispersant 2 | 90.10 | 20 | | | 20 | | | | | 60 | | 9 | 0.90 |
| Comparative polymeric dispersant 3 | 90.10 | | | 80 | 20 | | | | | | | 9 | 0.90 |

Units [parts]

In the table:
DM: N,N-dimethylaminoethyl methacrylate
DMAPAA: N,N-dimethylaminopropyl acrylamide
STMA: stearyl methacrylate
LMA: lauryl methacrylate
2-EHA: 2-ethylhexyl acrylate
C-1: compound of general formula (1) in which $R^1$ represents $CH_3$, $R^2$ represents $CH_3$, n=9 and A represents an ethylene group
C-2: compound of general formula (1) in which $R^1$ represents $CH_3$, $R^2$ represents H, n=9 and A represents a propylene group
C-3: compound of general formula (1) in which $R^1$ represents $CH_3$, $R^2$ represents $CH_3$, n=24 and A represents an ethylene group
C-4: compound of general formula (1) in which $R^1$ represents $CH_3$, $R^2$ represents $C_{18}H_{37}$, n=30 and A represents an ethylene group
C-5: compound of general formula (1) in which $R^1$ represents $CH_3$, $R^2$ represents $CH_3$, n=2 and A represents an ethylene group Values for the physical properties of the obtained polymeric dispersants are shown in Table 7.

TABLE 7

| | Non-volatile fraction | Amine value (mgKOH/g) | Weight-average molecular weight (Mw) |
|---|---|---|---|
| Polymeric dispersant 1 | 50% by mass | 65 | 7,000 |
| Polymeric dispersant 2 | 50% by mass | 65 | 7,380 |
| Polymeric dispersant 3 | 50% by mass | 65 | 7,090 |
| Polymeric dispersant 4 | 50% by mass | 65 | 6,980 |
| Polymeric dispersant 5 | 50% by mass | 33 | 7,210 |
| Polymeric dispersant 6 | 50% by mass | 68 | 20,100 |
| Polymeric dispersant 7 | 50% by mass | 61 | 6,550 |
| Polymeric dispersant 8 | 50% by mass | 65 | 3,200 |
| Polymeric dispersant 9 | 50% by mass | 65 | 150,900 |
| Polymeric dispersant 10 | 50% by mass | 71 | 6,700 |
| Polymeric dispersant 11 | 50% by mass | 162 | 7,220 |
| Comparative polymeric dispersant 1 | 50% by mass | 65 | 6,940 |
| Comparative polymeric dispersant 2 | 50% by mass | 65 | 7,010 |
| Comparative polymeric dispersant 3 | 50% by mass | 0 | 7,000 |

(Colorants)
Cyan Colorant
  C.I. Pigment Blue 15:3 (copper phthalocyanine blue), Lionol Blue FG7919 (manufactured by Toyocolor Co., Ltd.)
Magenta Colorants
  C.I. Pigment Red 122 (quinacridone magenta), Hostaperm Pink E (manufactured by Clariant Ltd.)
  C.I. Pigment Red 57:1 (carmine 6B), Permanent Rubine L6B (manufactured by Clariant Ltd.) Yellow Colorant
  C.I. Pigment Yellow 180 (benzimidazolone yellow), Novoperm Yellow P-HG (manufactured by Clariant Ltd.)
Black Colorant
  Carbon black, NIPEX 150 (manufactured by Degussa AG), containing the aforementioned C.I. Pigment Blue 15:3 as an added blue component
(Pigment Dispersant)
  Solsperse 24000SC, acid value: 25 mgKOH/g, a basic resin dispersant (polyamine-based resin)
(Carrier Liquid)
  Exxsol D130, a naphthene-based hydrocarbon (manufactured by Exxon Mobil Corporation), dry point: 313° C., aniline point: 89° C., kinematic viscosity: 6.12 mm²/s, viscosity: 0.824 g/cm³

Example 1

C.I. Pigment Blue 15:3 (Lionol Blue FG7919) 18 parts by mass

Binder resin 1 80 parts by mass
Solsperse 24000SC 2 parts by mass

The above materials (total: 5 kg) were mixed (at 3,000 rpm for 3 minutes) in a Henschel mixer having a capacity of 20 L, were subsequently subjected to melt kneading in a biaxial kneading extruder (PCM30) under conditions including a supply rate of 6 kg/hr and a discharge temperature of 145° C., and were then further kneaded using a triple roll mill using a roll temperature of 140° C. Following cooling and solidification, the solid was coarsely ground using a hammer mill, and was then finely ground using an I-type jet mill (model: IDS-2) to obtain a cyan ground product 1 having an average particle size of 5.0 μm.

Cyan ground product 1 25 parts by mass
Exxsol D130 72 parts by mass
Polymeric dispersant 1 3 parts by mass The above materials were weighed, and then stirred and mixed thoroughly, thereby dispersing the cyan ground product 1 in a solution of the Exxsol D130 (slurry concentration: 25% by mass)

Using a Dyno-Mill Multilab (manufactured by Shinmaru Enterprises Corporation, capacity: 1.4 L), which is a wet grinder that is a medium-agitation mill, the slurry containing the dispersed cyan ground product 1 was subjected to wet grinding under circulatory operating conditions for 60 minutes.

The conditions for the wet grinding were was follows.

Agitator discs (material: zirconia) speed: 10 m/s, cylinder: ZTA, media (material: zirconia) diameter: 1.25 mm, fill rate: 70%, solution flow rate: 45 kg/h, cooling water: 5 L/min, pressure: 0.1 kg/cm$^2$ After performing wet grinding for 60 minutes, the slurry was removed and passed through a mesh (made of SUS304) having a mesh size of 33 μm, thus obtaining a liquid developer 1C (containing cyan toner particles 1). Investigation of the particle size distribution of the cyan toner particles 1 revealed an average particle size (D50) of 2.6 μm. The viscosity (η) of the liquid developer 1C was 50 mPa·s.

Using the raw materials shown in Table 8 and Table 9 and the same method as that described for Example 1, a series of toner ground products and liquid developers were prepared. The particle sizes were measured using a laser diffraction/scattering particle size analyzer Microtrac HRA manufactured by Nikkiso Co., Ltd., using Exxsol™ D80 (manufactured by Exxon Mobil Corporation) as the solvent, and under atmospheric conditions of 23° C. and 50% RH, and the average particle size (D50) represents the particle size at 50% in the cumulative distribution. The viscosity (q) of each of the liquid developers was measured using an E-type viscometer TV-22 manufactured by Told Sangyo Co., Ltd. The solid fraction within the liquid developer was adjusted to 25%, and following thorough blending at 25° C., a 1° 34' cone was installed in the TV-22 viscometer, and the viscosity was measured after one minute at 20 rpm.

TABLE 8

| Composition | Cyan Ground product 1 | Ground product 2 | Ground product 3 | Ground product 4 | Ground product 5 | Ground product 6 | Ground product 7 | Ground product 8 | Ground product 9 | Yellow Ground product | Magenta Ground product | Black Ground product |
|---|---|---|---|---|---|---|---|---|---|---|---|---|
| Binder resin 1 | 80 | | | | | | | | | 80 | 78 | 79 |
| Binder resin 2 | | 80 | | | | | | | | | | |
| Binder resin 3 | | | 80 | | | | | | | | | |
| Binder resin 4 | | | | 80 | | | | | | | | |
| Binder resin 5 | | | | | 80 | | | | | | | |
| Binder resin 6 | | | | | | 80 | | | | | | |
| Binder resin 7 | | | | | | | 80 | | | | | |
| Binder resin 8 | | | | | | | | 80 | | | | |
| Binder resin 9 | | | | | | | | | 80 | | | |
| C.I. Pigment Blue 15:3 | 18 | 18 | 18 | 18 | 18 | 18 | 18 | 18 | 18 | | | 1 |
| C.I. Pigment Yellow 180 | | | | | | | | | | 18 | | |
| C.I. Pigment Red 122 | | | | | | | | | | | 10 | |
| C.I. Pigment Red 57:1 | | | | | | | | | | | 10 | |
| Carbon black | | | | | | | | | | | | 20 |
| Solsperse 24000SC | 2 | 2 | 2 | 2 | 2 | 2 | 2 | 2 | 2 | 2 | 2 | |

Units [parts]

TABLE 9

| | Toner ground product | parts by mass | Polymeric dispersant (C) | parts by mass | Carrier liquid (D) | parts by mass |
|---|---|---|---|---|---|---|
| Example 1 | Liquid developer 1C | Cyan ground product 1 | 25 | Polymeric dispersant 1 | 3 | Exxsol D130 | 72 |
| Example 2 | Liquid developer 2C | Cyan ground product 1 | 25 | Polymeric dispersant 2 | 3 | Exxsol D130 | 72 |
| Example 3 | Liquid developer 3C | Cyan ground product 1 | 25 | Polymeric dispersant 3 | 3 | Exxsol D130 | 72 |

TABLE 9-continued

|  |  | Toner ground product | parts by mass | Polymeric dispersant (C) | parts by mass | Carrier liquid (D) | parts by mass |
|---|---|---|---|---|---|---|---|
| Example 4 | Liquid developer 4C | Cyan ground product 1 | 25 | Polymeric dispersant 4 | 3 | Exxsol D130 | 72 |
| Example 5 | Liquid developer 5C | Cyan ground product 1 | 25 | Polymeric dispersant 5 | 3 | Exxsol D130 | 72 |
| Example 6 | Liquid developer 6C | Cyan ground product 1 | 25 | Polymeric dispersant 6 | 3 | Exxsol D130 | 72 |
| Example 7 | Liquid developer 7C | Cyan ground product 1 | 25 | Polymeric dispersant 7 | 3 | Exxsol D130 | 72 |
| Example 8 | Liquid developer 8C | Cyan ground product 1 | 25 | Polymeric dispersant 8 | 3 | Exxsol D130 | 72 |
| Example 9 | Liquid developer 9C | Cyan ground product 1 | 25 | Polymeric dispersant 9 | 3 | Exxsol D130 | 72 |
| Example 10 | Liquid developer 10C | Cyan ground product 1 | 25 | Polymeric dispersant 10 | 3 | Exxsol D130 | 72 |
| Example 11 | Liquid developer 11C | Cyan ground product 1 | 25 | Polymeric dispersant 11 | 3 | Exxsol D130 | 72 |
| Example 12 | Liquid developer 12C | Cyan ground product 2 | 25 | Polymeric dispersant 1 | 3 | Exxsol D130 | 72 |
| Example 13 | Liquid developer 13C | Cyan ground product 3 | 25 | Polymeric dispersant 1 | 3 | Exxsol D130 | 72 |
| Example 14 | Liquid developer 14C | Cyan ground product 4 | 25 | Polymeric dispersant 1 | 3 | Exxsol D130 | 72 |
| Example 15 | Liquid developer 15C | Cyan ground product 5 | 25 | Polymeric dispersant 1 | 3 | Exxsol D130 | 72 |
| Example 16 | Liquid developer 16C | Cyan ground product 6 | 25 | Polymeric dispersant 1 | 3 | Exxsol D130 | 72 |
| Example 17 | Liquid developer 17C | Cyan ground product 7 | 25 | Polymeric dispersant 1 | 3 | Exxsol D130 | 72 |
| Example 18 | Liquid developer 18C | Cyan ground product 8 | 25 | Polymeric dispersant 1 | 3 | Exxsol D130 | 72 |
| Example 19 | Liquid developer 19C | Cyan ground product 9 | 25 | Polymeric dispersant 1 | 3 | Exxsol D130 | 72 |
| Example 20 | Liquid developer 20Y | Yellow ground product | 25 | Polymeric dispersant 1 | 3 | Exxsol D130 | 72 |
| Example 21 | Liquid developer 21M | Magenta ground product | 25 | Polymeric dispersant 1 | 3 | Exxsol D130 | 72 |
| Example 22 | Liquid developer 22K | Black ground product | 25 | Polymeric dispersant 1 | 3 | Exxsol D130 | 72 |
| Comparative Example 1 | Liquid developer 31C | Cyan ground product 1 | 25 | Comparative polymeric dispersant 1 | 3 | Exxsol D130 | 72 |
| Comparative Example 2 | Liquid developer 32C | Cyan ground product 1 | 25 | Comparative polymeric dispersant 2 | 3 | Exxsol D130 | 72 |
| Comparative Example 3 | Liquid developer 33C | Cyan ground product 1 | 25 | Comparative polymeric dispersant 3 | 3 | Exxsol D130 | 72 |
| Comparative Example 4 | Liquid developer 34Y | Yellow ground product | 25 | Comparative polymeric dispersant 1 | 3 | Exxsol D130 | 72 |
| Comparative Example 5 | Liquid developer 35M | Magenta ground product | 25 | Comparative polymeric dispersant 1 | 3 | Exxsol D130 | 72 |
| Comparative Example 6 | Liquid developer 36K | Black ground product | 25 | Comparative polymeric dispersant 1 | 3 | Exxsol D130 | 72 |

An actual copying test was performed using an altered version of a commercially available liquid developer copier (Savin 870, manufactured by Savin Corporation), under conditions including environment conditions of 23° C. and 50% RH, an amorphous silicon photoreceptor, a photoreceptor surface potential of +450 to 500 V, a residual potential of not more than +50 V, and a developing roller bias of +250 to 450 V, and 1,000 images were printed from the start of the test. Evaluations of the image density and the fixing ratio were performed using the 1,000th image, whereas evaluation of the cold offset resistance was performed using those images from the 951st image onward. Image preparation was performed by outputting each color individually onto OK Topcoat paper manufactured by Oji Paper Co., Ltd., and the thermocompression bonding was performed under conditions including a speed of 30 m/min and a temperature of 160° C.

(Image Density)

First, the image density was measured using a Gretag-Macbeth densitometer (D-196). From a practical perspective, density values for each color of 1.2 or greater for yellow, 1.4 or greater for magenta and cyan, and 1.6 or greater for black are preferred. More preferred values are 1.3 or greater for yellow, 1.5 or greater for magenta and cyan, and 1.7 or greater for black.

(Fixing Ratio)

The fixing ratio was measured using a printed image that was output with a 1 cm×1 cm solid-printed portion, and was measured by measuring the image density ID ($ID_1$) at the time of output. Subsequently, a mending tape (Scotch Tape 810, manufactured by 3M Corporation) was adhered to the printed image, and a 1 kg circular cylindrical brass weight was rolled back and forth once. Subsequently, the mending tape was removed, the image density ID ($ID_2$) was remeasured, and the fixing ratio was determined by calculating the value of $(ID_2)/(ID_1) \times 100$. A fixing ratio of 80% or greater is preferable from a practical perspective, and a fixing ratio of 90% or greater is particularly preferred.

(Cold Offset Resistance)

The cold offset resistance was evaluated by outputting images using the aforementioned liquid developer copier, subjecting ten of the outputted images to consecutive thermocompression bonding using an external fixing unit under conditions including a speed of 30 m/min and a nip thickness of 6 mm, and upon thermocompression bonding of the 10th outputted image, ascertaining whether a retransferred toner image existed on the 10th outputted image (paper). The temperature at which a retransferred image no longer existed was evaluated using a 4-stage scale. A thermocompression bonding roller temperature of less than 140° C. is preferred from a practical perspective, and a temperature of less than 120° C. is particularly preferred.

A: thermocompression bonding roller temperature of less than 120° C.

B: thermocompression bonding roller temperature of at least 120° C. but less than 140° C.

C: thermocompression bonding roller temperature of at least 140° C. but less than 160° C.

D: thermocompression bonding roller temperature of 160° C. or higher (Storage Stability)

The storage stability of each of the liquid developers was evaluated in the following manner.

Each obtained liquid developer was left to stand for 3 months in a constant-temperature and constant-humidity atmosphere at 25° C. and 50% RH. After standing for 3 months, the average particle size (D50) and the viscosity ($\eta$) of the liquid developer were remeasured, and the storage stability was evaluated on the basis of the increase in the measured values from the values prior to the test.

Average particle size (D50)

A: Average particle size (D50) after test/average particle size (D50) before test is less than 1.1

B: Average particle size (D50) after test/average particle size (D50) before test is at least 1.1 but less than 1.2

C: Average particle size (D50) after test/average particle size (D50) before test is 1.2 or greater The value of average particle size (D50) after test/average particle size (D50) before test is preferably less than 1.2 from a practical perspective, and is more preferably less than 1.1.

Viscosity ($\eta$)

A: Viscosity ($\eta$) after test/viscosity ($\eta$) before test is less than 1.1

B: Viscosity ($\eta$) after test/viscosity ($\eta$) before test is at least 1.1 but less than 1.4

C: Viscosity ($\eta$) after test/viscosity ($\eta$) before test is 1.4 or greater The value of viscosity ($\eta$) after test/viscosity ($\eta$) before test is preferably less than 1.4 from a practical perspective, and is more preferably less than 1.1.

Details relating to the physical properties and the test results for the liquid developers are shown in Table 10.

TABLE 10

| | | Average particle size D50 (μm) | Viscosity $\eta$ (mPa·s) | Image density | Fixing ratio (%) | Cold offset resistance | Storage stability Average particle size D50 | Storage stability Viscosity $\eta$ |
|---|---|---|---|---|---|---|---|---|
| Example 1 | Liquid developer 1C | 2.6 | 50 | 1.63 | 87 | B | A | A |
| Example 2 | Liquid developer 2C | 2.4 | 56 | 1.56 | 84 | B | A | A |
| Example 3 | Liquid developer 3C | 2.3 | 45 | 1.52 | 89 | B | A | A |
| Example 4 | Liquid developer 4C | 2.4 | 65 | 1.60 | 92 | A | B | B |
| Example 5 | Liquid developer 5C | 2.7 | 48 | 1.55 | 90 | A | B | B |

TABLE 10-continued

|  |  | Average particle size D50 (μm) | Viscosity η (mPa · s) | Image density | Fixing ratio (%) | Cold offset resistance | Storage stability | |
|---|---|---|---|---|---|---|---|---|
|  |  |  |  |  |  |  | Average particle size D50 | Viscosity η |
| Example 6 | Liquid developer 6C | 2.5 | 64 | 1.54 | 88 | A | A | A |
| Example 7 | Liquid developer 7C | 2.5 | 52 | 1.49 | 87 | B | A | B |
| Example 8 | Liquid developer 8C | 2.2 | 56 | 1.48 | 85 | A | B | B |
| Example 9 | Liquid developer 9C | 2.6 | 58 | 1.52 | 83 | B | B | B |
| Example 10 | Liquid developer 10C | 2.6 | 68 | 1.61 | 90 | B | A | A |
| Example 11 | Liquid developer 11C | 2.5 | 65 | 1.55 | 88 | B | B | B |
| Example 12 | Liquid developer 12C | 2.7 | 58 | 1.58 | 83 | B | A | A |
| Example 13 | Liquid developer 13C | 2.0 | 47 | 1.67 | 94 | A | A | A |
| Example 14 | Liquid developer 14C | 2.1 | 50 | 1.63 | 90 | B | A | A |
| Example 15 | Liquid developer 15C | 2.3 | 47 | 1.70 | 94 | A | A | B |
| Example 16 | Liquid developer 16C | 2.8 | 54 | 1.42 | 90 | A | B | B |
| Example 17 | Liquid developer 17C | 2.8 | 72 | 1.54 | 82 | B | A | A |
| Example 18 | Liquid developer 18C | 2.7 | 49 | 1.44 | 88 | A | B | B |
| Example 19 | Liquid developer 19C | 3.1 | 113 | 1.50 | 81 | B | B | A |
| Example 20 | Liquid developer 20Y | 2.8 | 62 | 1.43 | 85 | B | A | A |
| Example 21 | Liquid developer 21M | 2.8 | 55 | 1.58 | 82 | B | A | A |
| Example 22 | Liquid developer 22K | 2.6 | 40 | 1.81 | 90 | B | A | A |
| Comparative Example 1 | Liquid developer 31C | 2.5 | 50 | 1.56 | 52 | D | A | A |
| Comparative Example 1 | Liquid developer 32C | 6.5 | 78 | 1.33 | 65 | C | C | C |
| Comparative Example 3 | Liquid developer 33C | 7.8 | 69 | 1.22 | 58 | C | C | C |
| Comparative Example 4 | Liquid developer 34Y | 2.8 | 95 | 1.35 | 55 | C | C | C |
| Comparative Example 5 | Liquid developer 35M | 2.6 | 102 | 1.53 | 58 | D | C | C |
| Comparative Example 6 | Liquid developer 36K | 2.5 | 85 | 1.78 | 52 | D | B | C |

Comparative Examples 1, and 4 to 6 did not include the ethylenically unsaturated monomer represented by general formula (1), and melting of the toner particles did not proceed, resulting in a deterioration in the fixability and the cold offset resistance. Comparative Examples 2 and 3 exhibited inferior grindability and dispersion stability, and therefore satisfactory levels of image density and stability could not be obtained.

In contrast, in the case of the liquid developers that used the polymeric dispersant (C), the results for the image density, fixability, cold offset resistance and storage stability were all within practically applicable ranges. Further, among the liquid developers that used a cyan toner, it was evident that Examples 13 to 15 were particularly superior in terms of the image density and the fixability. Further, because the density, fixability and cold offset properties were excellent, printed matter having excellent color development and color reproducibility was obtained.

INDUSTRIAL APPLICABILITY

The polymeric dispersant for a liquid developer that represents an embodiment of the present invention exhibits excellent color reproducibility, color development, storage stability, fixability and cold offset resistance, and can be used favorably as a polymeric dispersant used in the development of electrostatic latent images in an electronic copier, printer or on-demand printing device or the like which forms images using an electrophotographic method or electrostatic recording method or the like.

The invention claimed is:

1. A liquid developer, comprising
a binder resin (A) comprising a polyester resin (a-1) and at least one resin (a-2) selected from the group consisting of a homopolymer of styrene or substitute thereof, an acrylic resin, and a styrene-based copolymer consisting of a styrene-(meth)acrylate ester copolymer,
a colorant (B),
a polymeric dispersant (C) comprising a copolymerization product of at least an ethylenically unsaturated monomer having an amino group, an ethylenically unsaturated monomer having an alkyl group with a carbon number of 9 to 24, and an ethylenically unsaturated monomer of formula (1):

$$CH_2=C(R^1)COO(AO)_nR^2 \qquad (1)$$

wherein
$R^1$ represents H or $CH_3$,
$R^2$ represents a hydrogen atom or a hydrocarbon group having a carbon number of 1 to 22,
n represents an integer of 1 to 200, and
A represents an alkylene group having a carbon number of 2 to 4, and
a carrier liquid (D).

2. The liquid developer according to claim 1, wherein the polymeric dispersant (C) has a weight-average molecular weight Mw that satisfies 500≤Mw≤40,000, and an amine value of 5 to 150 mgKOH/g.

3. The liquid developer according to claim 1, wherein the binder resin (A) has a softening temperature of 80 to 140° C.

4. The liquid developer according to claim 1, wherein a weight-average molecular weight Mw of the binder resin (A) satisfies 2,000≤Mw≤100,000.

5. The liquid developer according to claim 1, wherein a mass ratio [(a-2)/(a-1)] between the polyester resin (a-1) and the at least one resin (a-2) is 1 or less.

6. The liquid developer according to claim 1, wherein the carrier liquid (D) is an aliphatic hydrocarbon.

7. The liquid developer according to claim 2, wherein the binder resin (A) comprises a polyester resin, and has a softening temperature of 80 to 140° C.

8. The liquid developer according to claim 3, wherein a weight-average molecular weight Mw of the binder resin (A) satisfies 2,000≤Mw≤100,000.

9. A printed matter comprising the liquid developer according to claim 1 upon a surface thereof.

10. A liquid developer, comprising
a binder resin (A) comprising a polyester resin (a-1) and at least one resin (a-2) selected from the group consisting of a styrene resin, an acrylic resin and a styrene-acrylic copolymer resin, wherein a mass ratio [(a-2)/(a-1)] between the polyester resin (a-1) and the at least one resin (a-2) is 0.5 or less,
a colorant (B),
a polymeric dispersant (C) comprising a copolymerization product of at least an ethylenically unsaturated monomer having an amino group, an ethylenically unsaturated monomer having an alkyl group with a carbon number of 9 to 24, and an ethylenically unsaturated monomer of formula (1):

$$CH_2=C(R^1)COO(AO)_nR^2 \qquad (1)$$

wherein
$R^1$ represents H or $CH_3$,
$R^2$ represents a hydrogen atom or a hydrocarbon group having a carbon number of 1 to 22,
n represents an integer of 1 to 200, and
A represents an alkylene group having a carbon number of 2 to 4, and
a carrier liquid (D).

11. The liquid developer according to claim 10, wherein the binder resin (A) has a softening temperature of 80 to 140° C.

12. The liquid developer according to claim 10, wherein a weight-average molecular weight Mw of the binder resin (A) satisfies 2,000≤Mw≤100,000.

13. The liquid developer according to claim 10, wherein the carrier liquid (D) is an aliphatic hydrocarbon.

14. A printed matter comprising the liquid developer according to claim 10 upon a surface thereof.

15. The liquid developer according to claim 10, wherein the polymeric dispersant (C) has a weight-average molecular weight Mw that satisfies 500≤Mw≤40,000, and an amine value of 5 to 150 mgKOH/g.

16. The liquid developer according to claim 11, wherein a weight-average molecular weight Mw of the binder resin (A) satisfies 2,000≤Mw≤100,000.

17. The liquid developer according to claim 15, wherein the binder resin (A) has a softening temperature of 80 to 140° C.

* * * * *